US010378341B2

(12) United States Patent
van Kuijk et al.

(10) Patent No.: US 10,378,341 B2
(45) Date of Patent: Aug. 13, 2019

(54) SYSTEMS AND METHODS FOR CEMENT EVALUATION

(71) Applicant: SCHLUMBERGER TECHNOLOGY CORPORATION, Sugar Land, TX (US)

(72) Inventors: Robert van Kuijk, Le Plessis Robinson (FR); Ram Sunder Kalyanraman, Vaucresson (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 702 days.

(21) Appl. No.: 14/891,409

(22) PCT Filed: May 16, 2014

(86) PCT No.: PCT/US2014/038294

§ 371 (c)(1),
(2) Date: Nov. 16, 2015

(87) PCT Pub. No.: WO2014/186640

PCT Pub. Date: Nov. 20, 2014

(65) Prior Publication Data

US 2016/0069181 A1 Mar. 10, 2016

(30) Foreign Application Priority Data

May 16, 2013 (EP) .................................... 13305630

(51) Int. Cl.
*E21B 47/14* (2006.01)
*E21B 47/00* (2012.01)
*G01V 1/30* (2006.01)

(52) U.S. Cl.
CPC .......... *E21B 47/14* (2013.01); *E21B 47/0005* (2013.01); *G01V 1/306* (2013.01)

(58) Field of Classification Search
CPC ...................................................... E21B 47/14
See application file for complete search history.

(56) References Cited

U.S. PATENT DOCUMENTS 4,685,092 A * 8/1987 Dumont ................... G01V 1/44 181/104
2006/0133205 A1* 6/2006 Van Kuijk .......... E21B 47/0005 367/35
2013/0114377 A1* 5/2013 Frisch ................ E21B 47/0005 367/35

FOREIGN PATENT DOCUMENTS

EP 1505252 A1 2/2005
WO 2012027334 A1 3/2012
WO 2012177262 A1 12/2012

OTHER PUBLICATIONS

International Search Report and Written Opinion issued in related International Application No. PCT/US2014/038294 dated Oct. 28, 2015.

(Continued)

*Primary Examiner* — John E Breene
*Assistant Examiner* — Jeffrey C Morgan
(74) *Attorney, Agent, or Firm* — Sara K. M. Hinkley

(57) ABSTRACT

Systems, methods, and devices for evaluating proper cement installation in a well are provided. In one example, a method includes receiving acoustic cement evaluation data having a first parameterization. At least a portion of the entire acoustic cement evaluation data may be corrected to account for errors in the first parameterization, thereby obtaining corrected acoustic cement evaluation data. This corrected acoustic cement evaluation data may be processed with an initial solid-liquid-gas model before performing a posteriori refinement of the initial solid-liquid-gas model, thereby obtaining a refined solid-liquid-gas model. A well log track-indicating whether a material behind the casing is a solid, (Continued)

liquid, or gas—may be generated by processing the corrected acoustic cement evaluation data using the refined solid-liquid-gas model.

10 Claims, 18 Drawing Sheets

(56) References Cited

OTHER PUBLICATIONS

Al-Suwaidi et al., "Increased Certainty in the Determination of Zonal Isolation Through the Integration of Annulus Geometry Imaging and Improved Solid-Fluid Discrimination", SPE 120061 presented at the 16th SPE Middle East Oil & Gas Show and Conference held in Bahrain International Exhibition Centre, Bahrain, Mar. 15-18, 2009, pp. 1-9.

Enwemadu et al., "An Integrated Approach to Cement Evaluation", SPE 162460 presented at the Abu Dhabi International Petroleum Exhibition & Conference held in Abu Dhabi, UAE, Nov. 11-14, 2012, pp. 1-10.

Hayden et al., "Case Studies in Evaluation of Cement with Wireline Logs in a Deep Water Environment", SPWLA 52nd Annual Logging Symposium, May 14-18, 2011, pp. 1-15.

Hongzhi et al., "New Practices for Cement Integrity Evaluation in the Complex Environment of Xinjiang Oil Field", SPE 157976 presented at the SPE Asia Pacific Oil and Gas Conference and Exhibition held in Perth, Australia, Oct. 22-24, 2012, pp. 1-11.

Morris et al., "Enhanced Ultrasonic Measurements for Cement and Casing Evaluation", AADE-07-NTCE-14 presented at the 2007 AADE National Technical Conference and Exhibition held at Houston, Texas, Apr. 10-12, 2007, pp. 1-13.

Schlumberger: "Isolation Scanner. Advanced evaluation of wellbore integrity", Dec. 31, 2011, pp. 1-8.

* cited by examiner

FIG. 5
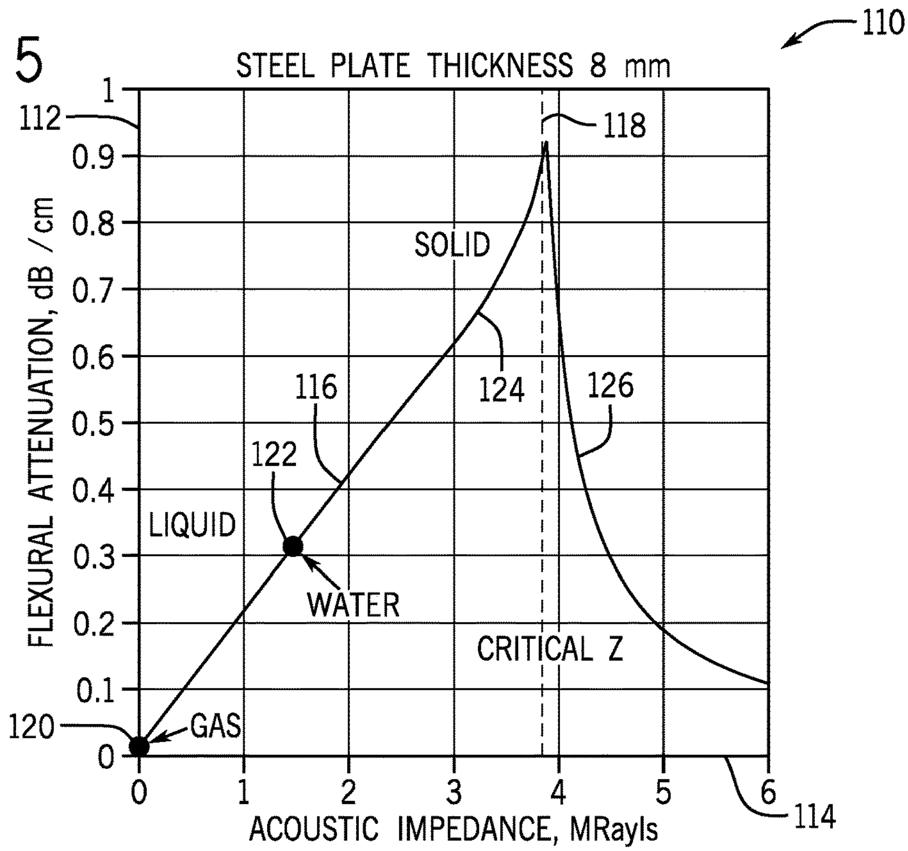
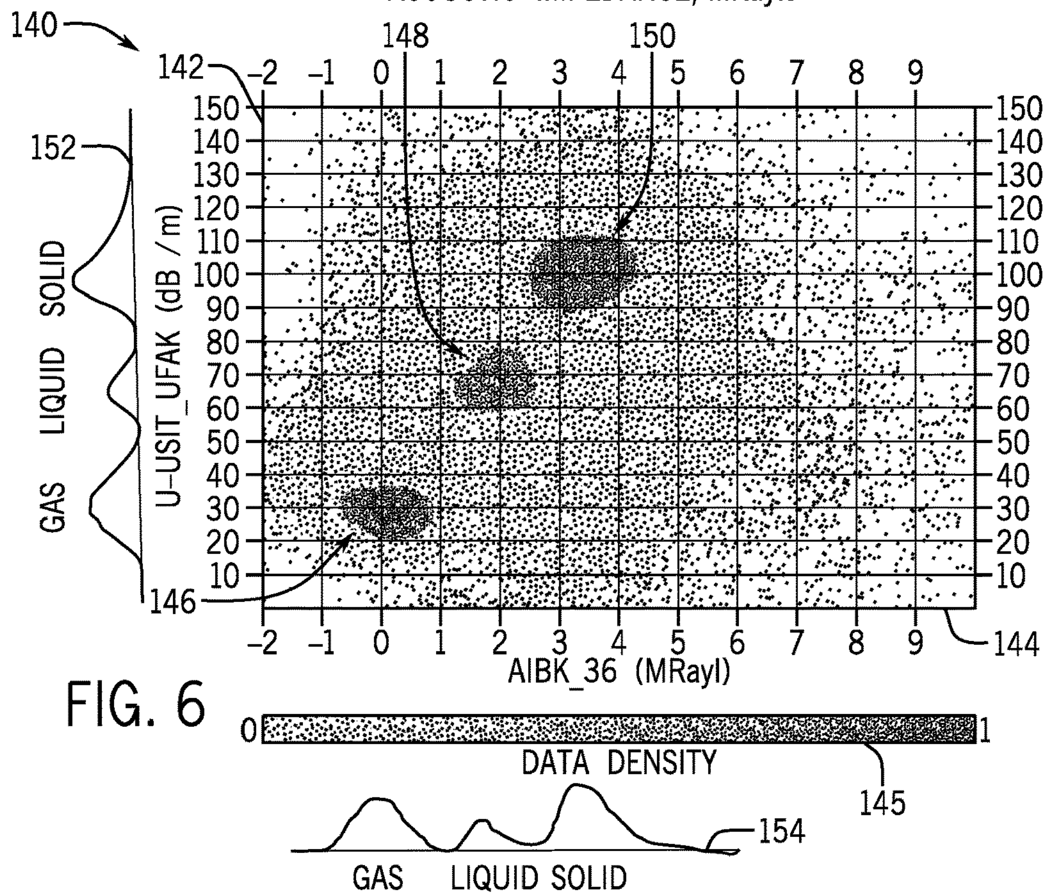
FIG. 6

FIG. 11
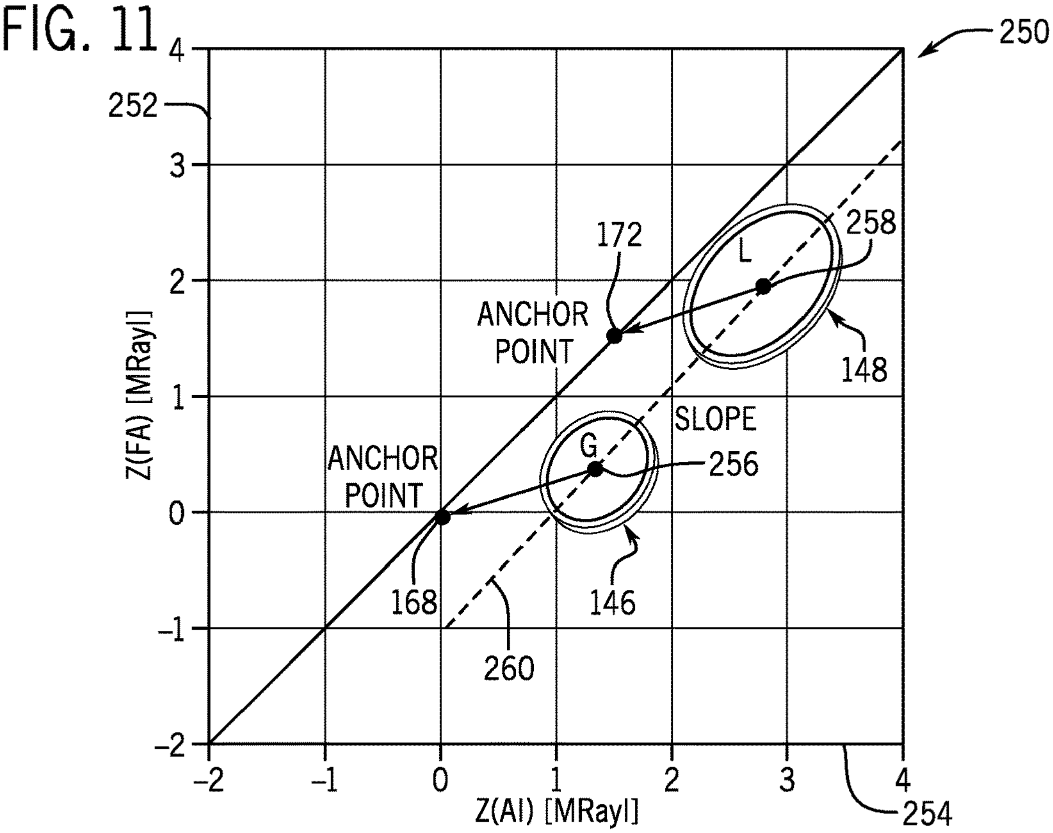
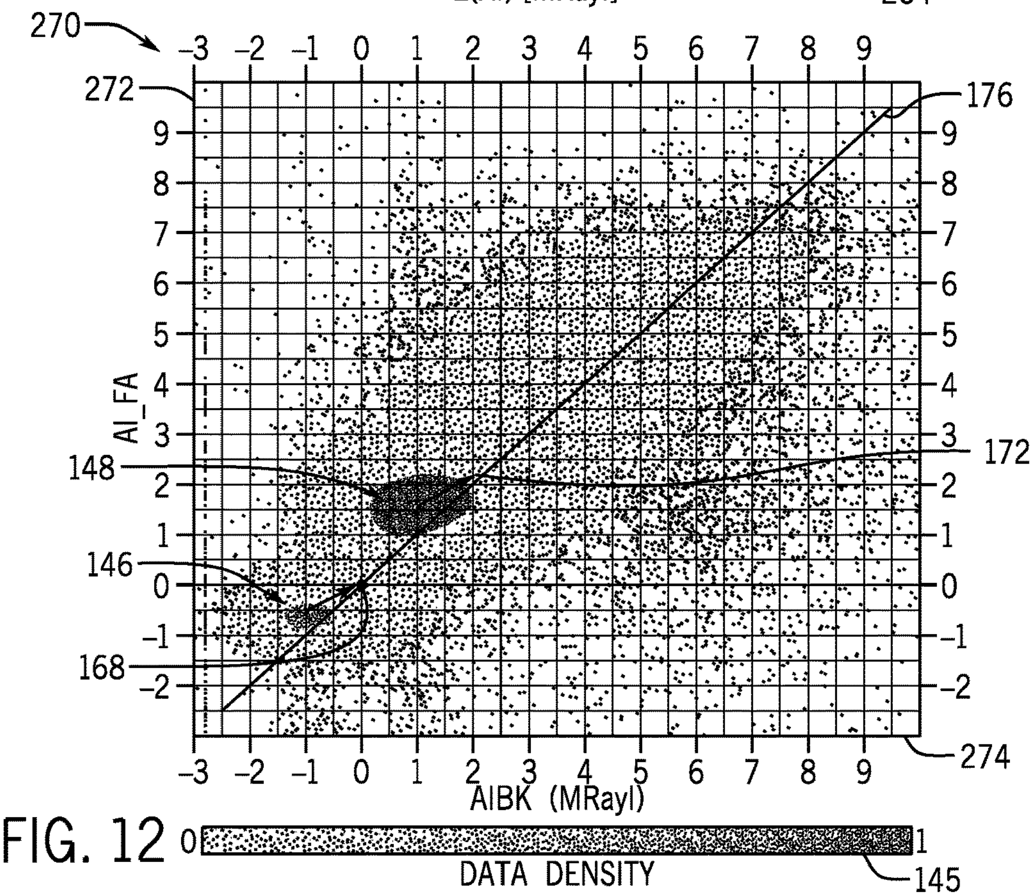
FIG. 12

SYSTEMS AND METHODS FOR CEMENT EVALUATION

BACKGROUND

This disclosure relates to evaluating cement behind a casing of a wellbore and, or particularly, to cement evaluation data processing associated with a solid-liquid-gas (SLG) model map.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light.

A wellbore drilled into a geological formation may be targeted to produce oil and/or gas from certain zones of the geological formation. To prevent zones from interacting with one another via the wellbore and to prevent fluids from undesired zones entering the wellbore, the wellbore may be completed by placing a cylindrical casing into the wellbore and cementing the annulus between the casing and the wall of the wellbore. During cementing, cement may be injected into the annulus formed between the cylindrical casing and the geological formation. When the cement properly sets, fluids from one zone of the geological formation may not be able to pass through the wellbore to interact with one another. This desirable condition is referred to as "zonal isolation." Yet well completions may not go as planned. For example, the cement may not set as planned and/or the quality of the cement may be less than expected. In other cases, the cement may unexpectedly fail to set above a certain depth due to natural fissures in the formation.

A variety of acoustic tools may be used to verify that cement is properly installed. These acoustic tools may use pulsed acoustic waves as they are lowered through the wellbore to obtain acoustic cement evaluation data (e.g., flexural attenuation and/or acoustic impedance measurements). A solid-liquid-gas (SLG) model map may be used to interpret the acoustic cement evaluation data to indicate whether solids, liquids, or gases are in the annulus behind the casing of the wellbore. When the SLG model map indicates that a solid is present, the cement is likely to have set properly. When the SLG model map indicates that a liquid or gas is present, the cement may be interpreted not to have properly set or otherwise may not be seen. Although the SLG model map can be used to map acoustic measurements to a probabilistic state of the material behind the casing (e.g., solid, liquid, or gas), certain well logging conditions, such as light cement, can challenge the effectiveness of the SLG model map.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of this disclosure relate to various systems, methods, and devices for evaluating proper cement installation in a well. Thus, the systems, methods, and devices of this disclosure describe various ways of using acoustic cement evaluation data obtained from acoustic downhole tools to identify when a material behind a casing in a well is likely to be a solid, liquid, or gas. In one example, a method includes receiving such acoustic cement evaluation data into a data processing system. The acoustic cement evaluation data may have a first parameterization. At least a portion of the entire acoustic cement evaluation data may be corrected to account for errors in the first parameterization, thereby obtaining corrected acoustic cement evaluation data. This corrected acoustic cement evaluation data may be processed with an initial solid-liquid-gas model before performing a posteriori refinement of the initial solid-liquid-gas model, thereby obtaining a refined solid-liquid-gas model. A well log track that indicates whether a material behind the casing is a solid, liquid, or gas may be generated by processing the corrected acoustic cement evaluation data using the refined solid-liquid-gas model.

In another example, a computer-readable media includes instructions to receive first acoustic cement evaluation data and, based at least in part on the first acoustic cement evaluation data, identify a material behind the casing as a solid, liquid, or gas, using a first solid-liquid-gas model. The instructions further including instructions to (a) perform a parametric correction of the first acoustic cement evaluation data to obtain corrected acoustic cement evaluation data before the material behind the casing is identified using the first solid-liquid-gas model, (b) use as the first solid-liquid-gas model a tight solid-liquid-gas model in which a gas threshold range is not directly adjacent to a liquid threshold range, (c) use as the first solid-liquid-gas model a solid-liquid-gas model that considers a flexural attenuation when a pulse-echo-derived acoustic impedance is below an evanescence point, and/or (d) perform a posteriori refinement of an a priori solid-liquid-gas model to obtain a refined solid-liquid-gas model and use as the first solid-liquid-gas model the refined solid-liquid-gas model.

In another example, a method includes obtaining flexural attenuation measurements and acoustic impedance measurements parameterized using first parameters. The flexural attenuation measurements and the acoustic impedance measurements are correlated to obtain x-y data points. Additionally, at least some of the x-y data points are corrected for errors of the first parameters, and/or at least some of the x-y data points are processed using a tight solid-liquid-gas model in which a gas threshold range is not directly adjacent to a liquid threshold range, and/or at least some of the x-y data points are processed using a solid-liquid-gas model that considers a flexural attenuation when a correlated pulse-echo-derived acoustic impedance is below an evanescence point, and/or an a posteriori refinement of an a priori solid-liquid-gas model is performed to obtain a refined solid-liquid-gas model using at least some of the x-y data points.

Various refinements of the features noted above may be undertaken in relation to various aspects of the present disclosure. Further features may also be incorporated in these various aspects as well. These refinements and additional features may be determined individually or in any combination. For instance, various features discussed below in relation to the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 5 is a plot illustrating a relationship between flexural attenuation and acoustic impedance measurements obtained in a well, in accordance with an embodiment;

FIG. 6 is a plot of flexural attenuation and acoustic impedance data points in an x-y density distribution, in accordance with an embodiment;

FIG. 11 is an example plot showing a way of correcting acoustic cement evaluation data points to more closely match expected nominal values, in accordance with an embodiment;

FIGS. 12 and 13 are plots of actual acoustic cement evaluation data points that are parametrically corrected to more closely match expected nominal values, in accordance with an embodiment;

DETAILED DESCRIPTION

Figure 1:
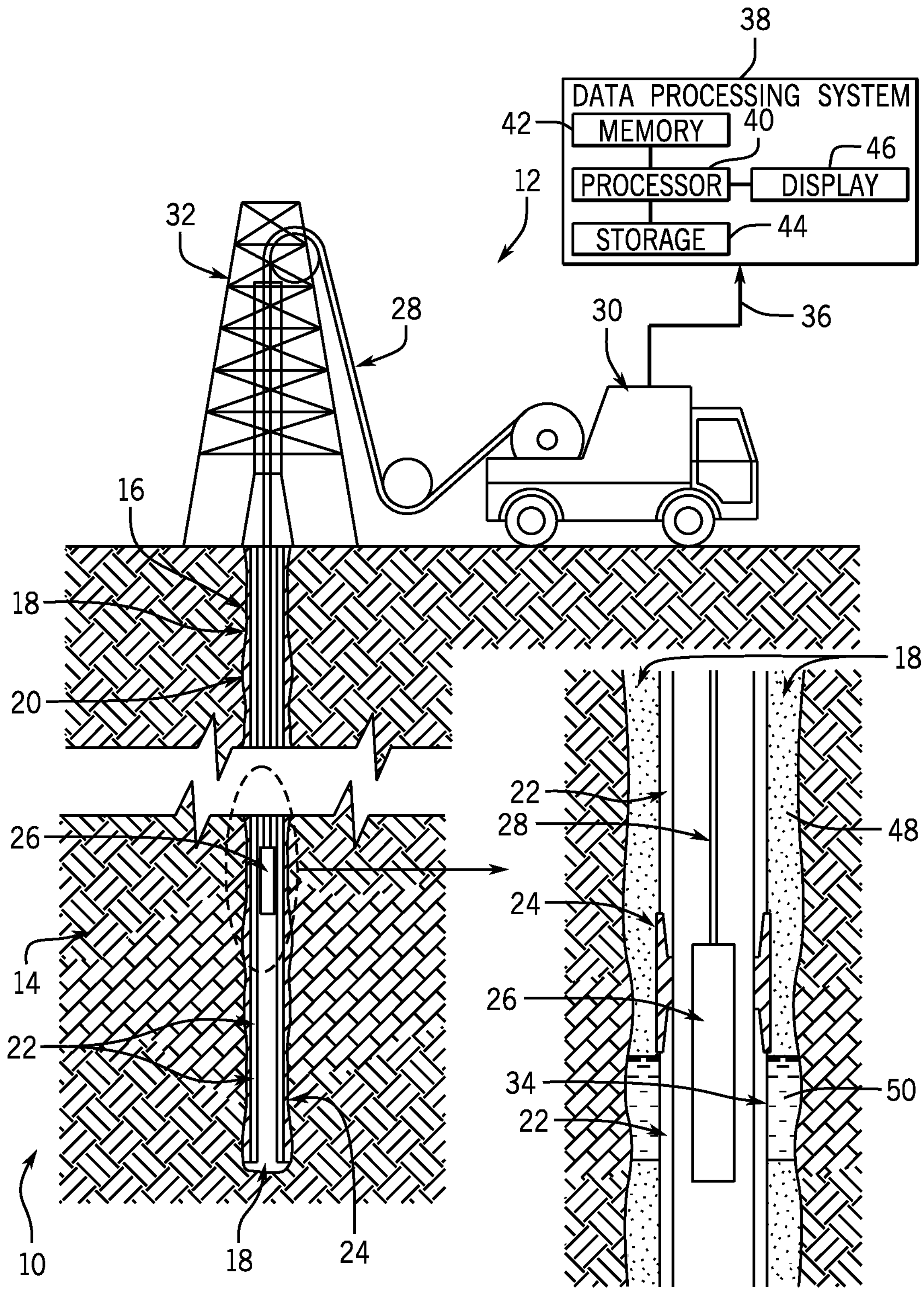
FIG. 1 is a schematic diagram of a system for verifying proper cement installation and/or zonal isolation of a well, in accordance with an embodiment.

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, metal casing may be installed inside the well and cement placed into the annulus between the casing and the wellbore. When the cement sets, fluids from one zone of the geological formation may not be able to pass through the annulus of the wellbore to interact with another zone. This desirable condition is referred to as "zonal isolation." Proper cement installation may also ensure that the well produces from targeted zones of interest. To verify that the cement has been properly installed, this disclosure teaches systems and methods for evaluating acoustic cement evaluation data. As used herein, "acoustic cement evaluation data" refers to acoustic impedance data and/or flexural attenuation data that may be obtained from one or more acoustic downhole tools.

The acoustic cement evaluation data may that is obtained by the acoustic downhole tools may be parameterized based on initial assumptions on the characteristics of the well and/or the acoustic downhole tools. For instance, the acoustic cement evaluation data may include an assumed type of liquid that may displace the cement in the annulus of the well (e.g., water or a hydrocarbon fluid) and/or a flexural attenuation calibration. Yet errors in these initial parameters could incorrectly predict the actual conditions in the well. As a result, the acoustic cement evaluation data may not accurately reflect the true conditions of the well. In addition, properties of different wells may not be well suited to a conservative solid-liquid-gas (SLG) model map used to identify whether a solid, liquid, or gas is likely in the annulus behind the casing. Before continuing, a "conservative" SLG model map, as referred to herein, represents an SLG model map that may discriminate between liquid, solid, and gas using acoustic cement evaluation data. An example of the conservative SLG model map will discussed below with reference to FIGS. 7, 16, and 17. In general, a conservative SLG model map may be obtained by a computer model that, given certain a priori parametric and/or data noise estimates, may develop the SLG model map based on this a priori information. In this way, SLG model maps may be unique to selected a priori parameters relating to the well, which may include nominal casing thickness. The a priori parametric and/or data noise estimates used to generate the conservative SLG model map 160 may be any suitable parametric and/or data noise estimates that, based on collections of empirical data from various wells, would be understood to conservatively classify acoustic cement evaluation data points as solids, liquids, and gases.

This disclosure teaches various ways to improve the results obtained from acoustic cement evaluation data. For instance, the initial acoustic cement evaluation data may be parametrically corrected to account for errors in parameter assumption, other solid-liquid-gas (SLG) models may be used, and/or SLG models may undergo posteriori refinement based on the actual acoustic cement evaluation data as it is applied to the SLG models. In essence, the disclosure relates to multimode processing and processing of independent acoustic measurements to determine whether a solid, liquid, or gas is likely to be present behind a casing of a well.

With this in mind, FIG. 1 schematically illustrates a system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations.

As seen in FIG. 1, several casing joints 22 (also referred to below as casing 22) are coupled together by the casing collars 24 to stabilize the wellbore 16. The casing joints 22 represent lengths of pipe, which may be formed from steel or similar materials. In one example, the casing joints 22 each may be approximately 13 m or 40 ft long, and may include an externally threaded (male thread form) connection at each end. A corresponding internally threaded (female thread form) connection in the casing collars 24 may connect two nearby casing joints 22. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. The acoustic logging tool 26 may be, for example, an UltraSonic Imager (USI) tool and/or an Isolation Scanner (IS) tool by Schlumberger Technology Corporation. The acoustic logging tool 26 may obtain measurements of acoustic impedance from ultrasonic waves and/or flexural attenuation. For instance, the acoustic logging tool 26 may obtain a pulse echo measurement that exploits the thickness mode (e.g., in the manner of an ultrasonic imaging tool) or may perform a pitch-catch measurement that exploits the flexural mode (e.g., in the manner of an imaging-behind-casing (IBC) tool). These measurements may be used as acoustic cement evaluation data in a solid-liquid-gas (SLG) model map to identify likely locations where solid, liquid, or gas is located in the annulus 20 behind the casing 22.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic cement evaluation data relating to the presence of solids, liquids, or gases behind the casing 22. For instance, the acoustic logging tool 26 may obtain measures of acoustic impedance and/or flexural attenuation, which may be used to determine where the material behind the casing 22 is a solid (e.g., properly set cement) or is not solid (e.g., is a liquid or a gas). When the acoustic logging tool 26 provides such measurements to the surface equipment 12 (e.g., through the cable 28), the surface equipment 12 may pass the measurements as acoustic cement evaluation data 36 to a data processing system 38 that includes a processor 40, memory 42, storage 44, and/or a display 46. In other examples, the acoustic cement evaluation data 36 may be processed by a similar data processing system 38 at any other suitable location. The data processing system 38 may collect the acoustic cement evaluation data 36 and determine whether such data 36 represents a solid, liquid, or gas using a solid-liquid-gas (SLG) model map. Additionally or alternatively, the data processing system 38 may perform a parametric correction of the acoustic cement evaluation data 36, may apply the data 36 to one or more different SLG models, and/or may perform a posteriori refinement of the SLG model. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the acoustic cement evaluation data 36 from the acoustic logging tool 26 may be used to determine whether cement of the annular fill 18 has been installed as expected. In some cases, the acoustic cement evaluation data 36 may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. For example, when the indicate the annular fill 18 has the generally liquid character as indicated at numeral 50, this may imply that the cement is either absent or was of the wrong type or consistency, and/or that fluid channels have formed in the cement of the annular fill 18. By processing the acoustic cement evaluation data 36, ascertaining the character of the annular fill 18 may be more accurate and/or precise than merely using the data 36 in a conservative SLG model map.

Figure 2:
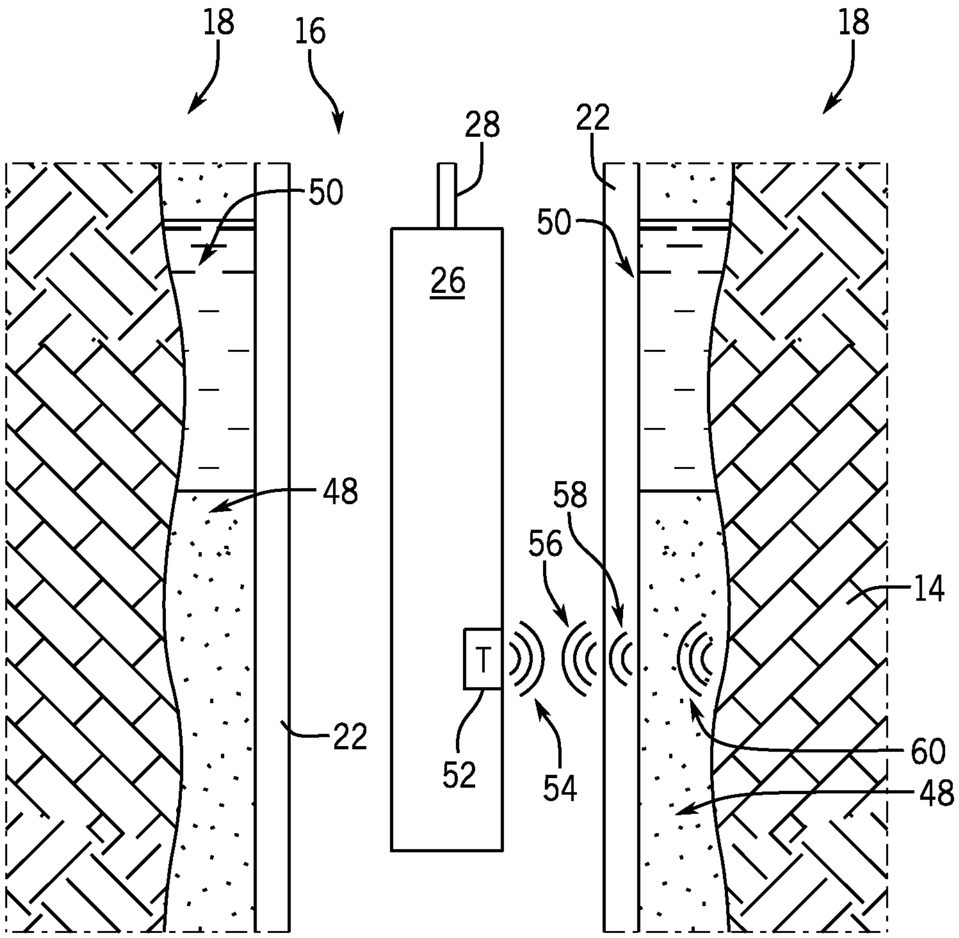
FIG. 2 is a block diagram of an acoustic downhole tool to obtain acoustic cement evaluation data relating to material behind casing of the well, in accordance with an embodiment.

With this in mind, FIG. 2 provides a general example of the operation of the acoustic logging tool 26 in the wellbore 16. Specifically, a transducer 54 in the acoustic logging tool 26 may emit acoustic waves 54 out toward the casing 22. Reflected waves 56, 58, and 60 may correspond to interfaces at the casing 22, the annular fill 18, and the geological formation 14 or an outer casing, respectively. The reflected waves 56, 58, and 60 may vary depending on whether the annular fill 18 is of the generally solid character 48 or the generally liquid or gas character 50. The acoustic logging tool 26 may use any suitable number of different techniques, including measurements of acoustic impedance from ultrasonic waves and/or flexural attenuation. As used below, the term "FA" refers to measured flexural attenuation, "AI" and "Z(AI)" refer to pulse-echo-derived acoustic impedance, and "Z(FA)" or "flexural-attenuation-derived acoustic impedance" refer to a calculation of acoustic impedance determined based on the flexural attenuation measurement. Various of these measurements obtained at the same depth in the wellbore 16 may be correlated to gain insight into the properties of the material behind the casing 22. These may be, for example, "FA-AI" data points, which relate flexural attenuation and pulse-echo-derived acoustic impedance, or "AI-AI" data points, which relate flexural-attenuation-derived acoustic impedance and pulse-echo-derived acoustic impedance. When one or more of these measurements of acoustic cement evaluation data are obtained, they may be parameterized based on initial assumptions on the characteristics of the well and/or the acoustic downhole tools. For instance, the acoustic cement evaluation data may include an assumed type of liquid that may displace the cement in the annulus of the well (e.g., water or a hydrocarbon fluid) and/or a flexural attenuation calibration. Yet it may be appreciated that these initial parameters could incorrectly predict the actual conditions in the well.

In any case, the acoustic cement evaluation data may be processed in various ways to achieve a final solid-liquid-gas (SLG) answer product. For instance, as shown by a flowchart 70 of FIG. 3, the acoustic cement evaluation data points may be obtained by measurements using one or more acoustic tools 26 (block 72). These acoustic cement evaluation data points may include, for example, acoustic impedance data, flexural attenuation data, or both.

The acoustic cement evaluation data may or may not warrant or undergo parametric correction (block 74). When the acoustic cement evaluation data is parametrically corrected, a self correction scheme (block 76) or a manual correction scheme (block 78) may be used in a correction of one or both of acoustic impedance or flexural attenuation measurements of the acoustic cement evaluation data. The parametric correction of block 74 will be described below with reference to FIGS. 4-15.

Whether or not the acoustic cement evaluation data is parametrically corrected, the data may be used for processing in one or more a priori solid-liquid-gas (SLG) models (block 80). This may include a conservative solid-liquid-gas (SLG) model 82, a "tight" SLG model 84, and/or a flexural attenuation-acoustic impedance SLG model 86 that expressly takes the evanescence point of the acoustic impedance into consideration. Processing using these a priori models of block 80 will be described below with reference to FIGS. 16-22.

If desired, the data processing system 38 may conduct posteriori refinement of one or more of the SLG models by comparing the way in which the actually obtained acoustic cement evaluation data fits into the SLG models (block 88). In some examples, this refinement may take place in a one-dimensional manner (block 90) or a two-dimensional manner (block 92). The posteriori model refinement of block 88 will be described below with reference to FIGS. 23-26.

Figure 3:
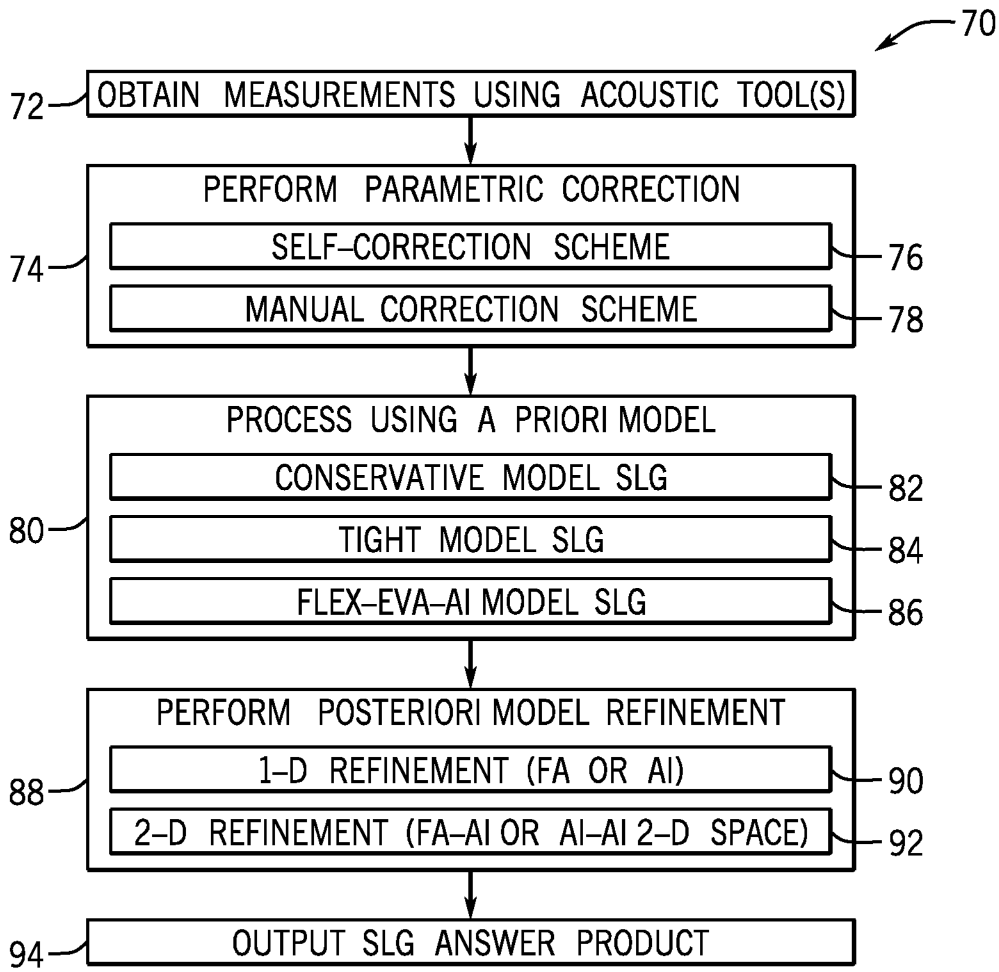
FIG. 3 is a flowchart of a method for interpreting the acoustic cement evaluation data, which may include a parametric correction, processing via a tight or flexural-evanescence-acoustic-impedance (Flex-EVA-AI) solid-liquid-gas (SLG) model, and/or posteriori model refinement, in accordance with an embodiment.

The data processing system 38 may provide a solid-liquid-gas (SLG) answer product using the SLG model maps of block 80 or the refined model map of block 88 (block 94). The answer product may include a well log that particularly discriminates solid, liquid, and/or gas that is likely to be behind the casing 22. Before continuing, it should be appreciated that the flowchart 70 of FIG. 3 is merely intended to provide an example process. In other examples, just some of the blocks discussed above may be carried out. In one embodiment, for example, the parametric correction of block 74 may be carried out but the posteriori refinement of block 88 may not. Indeed, any combination of the above acts may be carried out as desired.

Parametric Correction

The raw information obtained from the acoustic tool(s) 26 may be parameterized using an initial parameterization. This initial parameterization may include, for example, a calibration of flexural attenuation (sometimes referred to as UFAO) and/or an expected acoustic impedance Z of the fluid in the wellbore 16. While databases may be used to help guide the initial parameterization, it may not be unusual to see parameter errors that can affect the ultimate interpretation of the acoustic cement evaluation data. As such, the acoustic cement evaluation data may be parametrically corrected before being interpreted in a solid-liquid-gas (SLG) model map.

Figure 14:
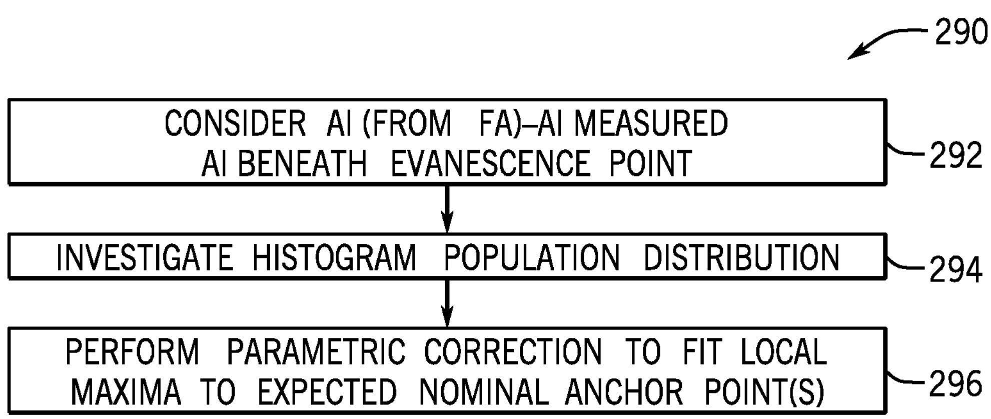
FIG. 14 is a flowchart of a method for correcting acoustic cement evaluation data having flexural attenuation or acoustic impedance measurements, in accordance with an embodiment.
Figure 15:
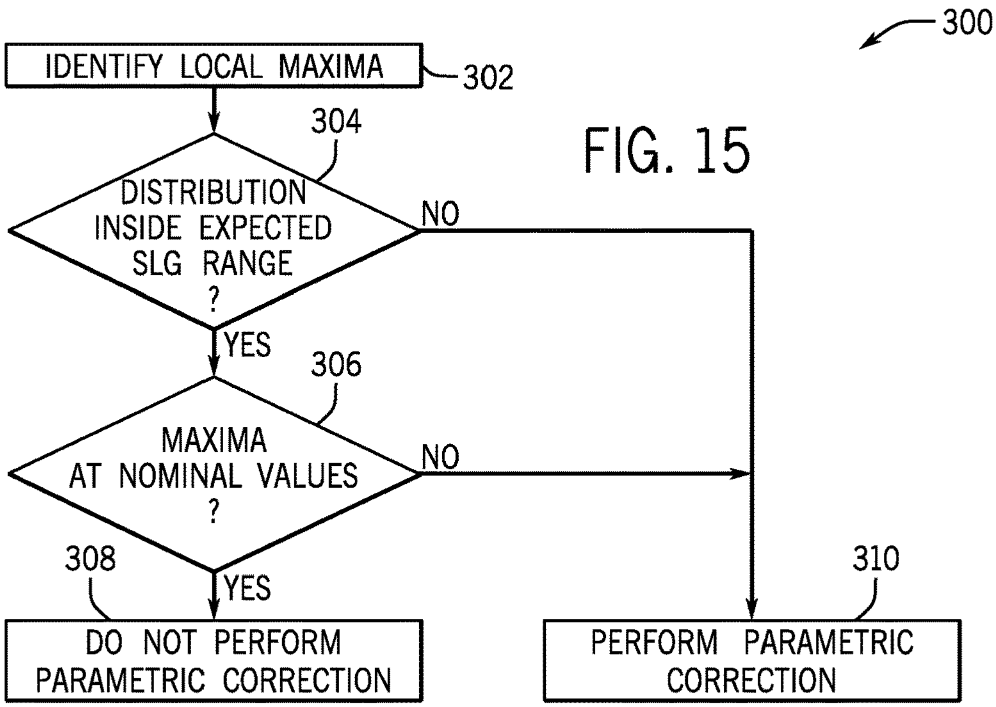
FIG. 15 is a flowchart of a method for parametrically correcting the acoustic cement evaluation data of FIG. 14, in accordance with an embodiment.

As will be discussed below, when the acoustic cement evaluation data includes both flexural attenuation data and acoustic impedance data, there are certain relationships between these different measurements that may inform when parameterization errors have occurred. The parameterization errors may be corrected by reprocessing with new corrected parameters or by directly correcting the acoustic cement evaluation data. FIGS. 4-13 relate to such a two-measurement approach, which is also referred to below as an x-y density distribution approach. FIGS. 14 and 15 relate to a similar one-measurement parametric correction to make a correction of the flexural attenuation or acoustic impedance data separately.

Figure 4:
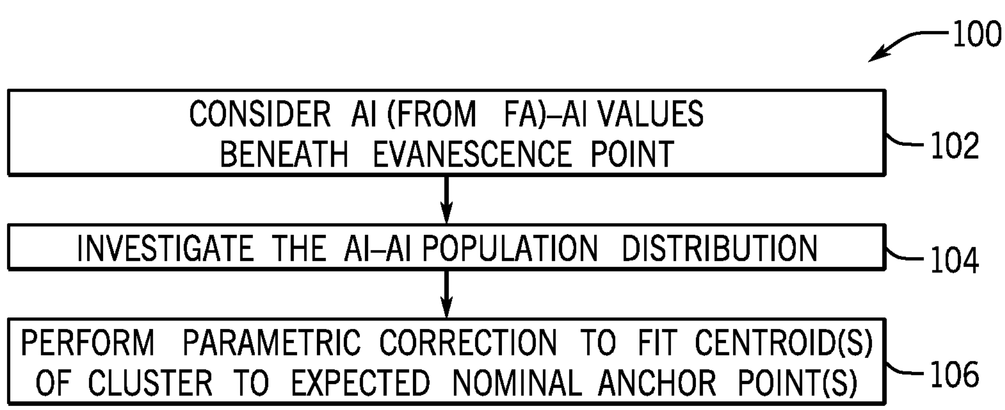
FIG. 4 is a flowchart for performing a parametric correction of the acoustic cement evaluation data, in accordance with an embodiment.

Parametric Correction Using Flexural Attenuation-Acoustic Impedance Relationship A flowchart 100 of FIG. 4 illustrates a two-measurement, x-y density distribution approach to make a parametric correction of the acoustic cement evaluation data. In the flowchart 100 of FIG. 4, the data processing system 38 may consider a relationship between pulse-echo-derived acoustic impedance data and acoustic impedance values derived from measured flexural attenuation values, which are referred to in this disclosure as AI-AI or Z(FA)-Z(AI) values or data points (block 102). Points beneath an evanescence point may be used for the analysis leading to parameter correction. These points beneath the evanescence point may be referred to as a "subset" of the entire dataset of data points. Once estimated, the correction can be applied to the entire dataset or some portion of the entire dataset, regardless of whether the points in the entire dataset or the portion of the entire dataset are above or below the evanescence point. The significance of the evanescence point and the transformation of the flexural attenuation data into second acoustic impedance data will be described below.

The data processing system may investigate the resulting AI-AI population distribution in the resulting x-y density distribution (block 104). The data processing system 38 may perform parametric correction on the AI-AI population of the x-y density distribution to fit centroids of the data to certain expected nominal anchor points (block 106). This process, and its ultimate results, will be described in greater detail below.

Indeed, FIG. 5 is a plot 110 that relates flexural attenuation (FA) in units of dB/cm (ordinate 112) to acoustic impedance (AI) in units of MRayls (abscissa 114). This relationship may be referred to as an FA-AI relationship. The measurements are shown to be test measurements obtained using a steel plate with an 8 mm thickness to simulate a casing 22. A curve 116 illustrates the relationship between experimental valves of flexural attenuation and acoustic impedance for known materials behind the steel plate that simulates the casing 22. As seen in FIG. 5, the curve 116 progresses in a substantially linear manner until reaching evanescence point 118 in the acoustic impedance. For acoustic impedance values beyond the evanescence point 118, the flexural attenuation no longer enjoys the same linear relationship, as illustrated by a curve 126. The evanescence point 118 represents the transition from a solid that is able to maintain both a compressional and shear propagation to that of just shear propagation.

A point 120, in which the flexural attenuation and acoustic impedance are around values of approximately zero, represents gas behind the steel plate that stimulates the casing 22. Thus, when the acoustic impedance and flexural attenuation both have values around zero, this implies that a gas is likely behind the casing 22. A point 122 generally represents liquid behind the steel plate that simulates the casing 22. In the example of FIG. 5, the point 122 represents a point where water is behind the steel plate that simulates the casing 22. Around an area 124, the acoustic impedance and flexural attenuation values begin to correspond to a solid (e.g., cement), rather than a liquid, behind the steel plate that simulates the casing 22 in the plot 110. Beyond the evanescence point 118, shown also to be impedance (Z), the material behind the steel plate that simulates the casing 22 is understood to be a solid.

As discussed above, there is linearity in the relationship between flexural attenuation and acoustic impedance up to the evanescence point 118 of the acoustic impedance. Indeed, the FA-AI measurement of gas, liquids, and light solids may fall below the evanescence limit 118 and have a linear slope as shown along the curve 116. Solids behind the casing 22 may have a wide range of FA-AI values. Liquids, which may result from displaced drilling muds and spacer fluids, may also vary in FA-AI values. Meanwhile, gas has a very tight, well-defined, and well-understood behavior of acoustic impedance, generally falling primarily along values near 0 for both flexural attenuation and acoustic impedance. Thus, for the subset of data points below the evanescence point 118, the following may be expected:

1. Linear relationship of FA-AI measurements.
2. A narrow and well-defined acoustic impedance for gas behind the casing 22, although measured flexural attenuation values may vary depending on the environment being logged, including casing thickness and well fluid properties.
3. A narrow distribution of FA-AI values for liquids, with likely uncertainty in the fluid properties and the potential for more than one kind of liquid behind the casing 22, which may add to the complexity of the resulting FA-AI values.

An example of actual experimental acoustic cement evaluation data, before parametric correction, appears in an x-y density distribution 140 of FIG. 6. In the x-y density distribution 140 of FIG. 6, flexural attenuation (FA) in units of dB/m (ordinate 42) is compared to acoustic impedance (AI) in units of MRayl (abscissa 144). A legend 145 shows the data density of areas on the x-y density distribution 140. As seen in FIG. 6, a first cluster 146 of FA-AI data points may generally correspond to a measurement of gas behind the casing 22, a second cluster 148 of FA-AI data points generally may relate to a liquid measured behind the casing 22, and a cluster 150 of FA-AI data points generally may relate to a solid behind the casing 22, though it may be seen that the flexural attenuation values beyond the evanescence point 118 (e.g., around 4 MRayl) may not share the general pattern of those data points before the evanescence point 118. Single-measurement curves 152 and 154 illustrate single-measurement density distributions for flexural attenuation and acoustic impedance, respectively. Local maxima of the curves 152 and 154 represent gases, liquids, and solids that correspond to the clusters 146, 148, and 150. It may be appreciated that, since flexural attenuation is the sum of inside and outside impedance, if inside fluid is backed, then the origin of x-y plots is (0,0) and otherwise is not (e.g., as shown in FIG. 6).

Figure 7:
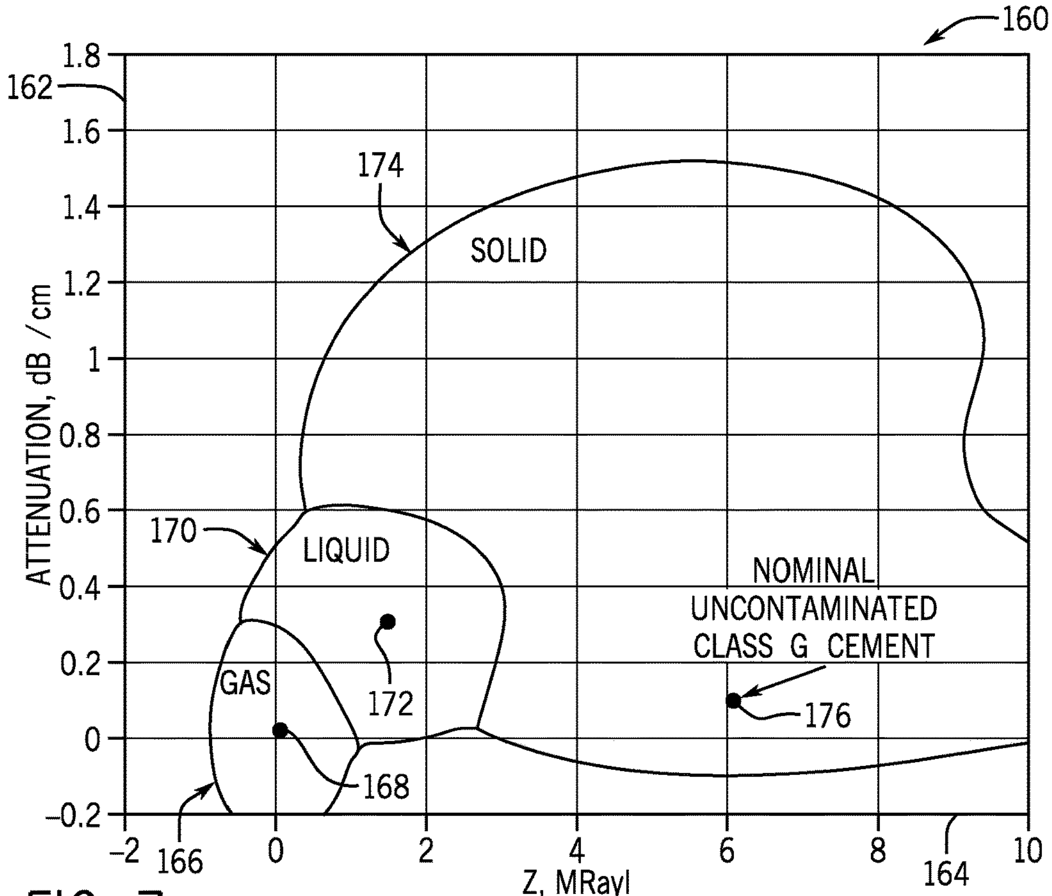
FIG. 7 is an example of a conservative solid-liquid-gas (SLG) model map, in accordance with an embodiment.

As will be discussed further below, one type of solid-liquid-gas (SLG) model map that may be used to process the acoustic cement evaluation data to identify solid, liquid, and gas behind the casing may be a conservative SLG model map. An example of a conservative SLG model map 160 is shown in FIG. 7. The conservative SLG model map 160 of FIG. 7 will be discussed briefly here to illustrate, for the purposes of parametric correction of the acoustic cement evaluation data, a relationship between the FA-AI data points in discriminating between solid, liquid, and gas.

The conservative solid-liquid-gas (SLG) model map 160 of FIG. 7 plots flexural attenuation (FA) in units of dB/cm (ordinate 162) against acoustic impedance (Z) in units of MRayl (abscissa 164). The SLG model map 160 of FIG. 7 may be used to discriminate the FA-AI acoustic cement evaluation data points to be interpreted as gas, liquid, or solid behind the casing 22. Before continuing, it should be noted that the SLG model map 160 of FIG. 7 may be developed using a computer model of data points that are likely to be obtained in the wellbore 16 by propagating certain parametric assumptions and noise estimates through the computer model (e.g., a Monte Carlo simulation of the acoustic tool(s) 26 in the wellbore 16). The a priori parametric and/or data noise estimates used to generate the conservative SLG model map 160 may be any suitable parametric and/or data noise estimates that, based on collections of empirical data from various wells, would be understood to conservatively classify acoustic cement evaluation data points as solids, liquids, and gases. As will be discussed further below, changing the noise estimates and/or parametric assumptions may produce other SLG model maps, such as a "tight" SLG model map that will be discussed below with reference to FIG. 21. In the SLG model map 160 of FIG. 7, data generally falling in a first threshold range 166, having a nominal point 168, may be classified as gas. The first threshold range 166 may also be referred to in this disclosure as the gas threshold range 166. Data points falling within a threshold range 170, having a nominal point 172, may be classified as liquid. The threshold range 170 may also be referred to in this disclosure as the liquid threshold range 170. Points falling within a threshold range 174, around a nominal point 176, may be classified as a solid (e.g., cement). The threshold range 174 may also be referred to in this disclosure as the solid threshold range 174. In the conservative SLG model map 160 of FIG. 7, the linear relationship discussed above with reference to FIG. 5 may not immediately be apparent.

Figure 8:
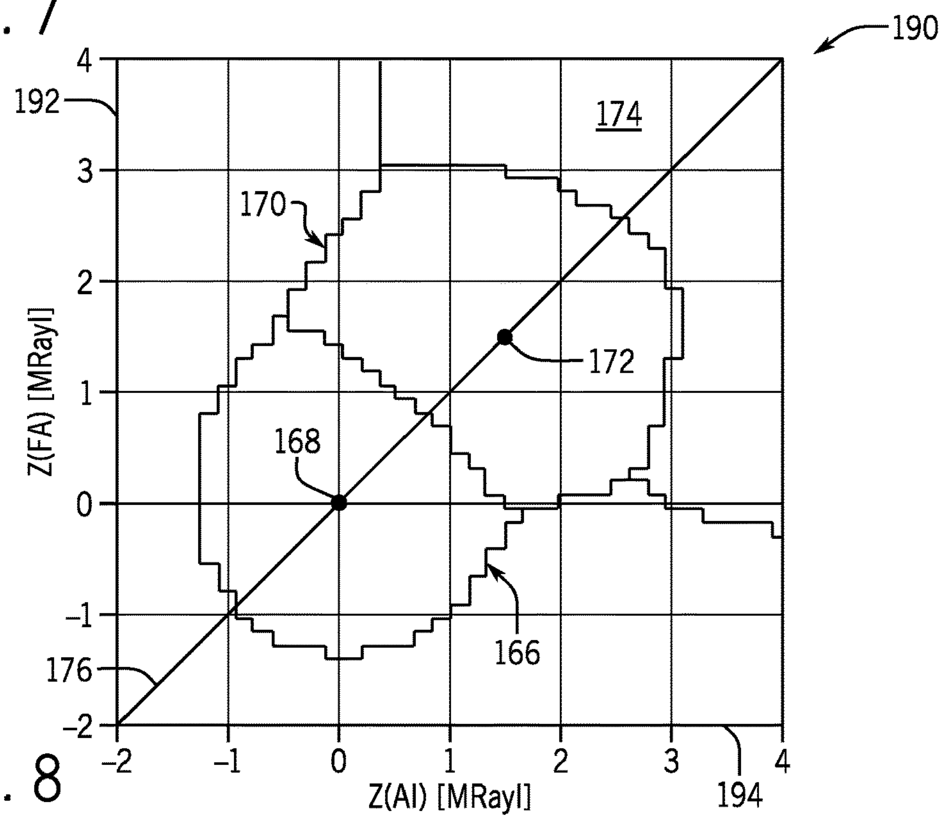
FIG. 8 is a plot showing a transformation of the conservative SLG model map of FIG. 7 using flexural attenuation data transformed into acoustic impedance data, in accordance with an embodiment.

The solid-liquid-gas (SLG) model map 160 of FIG. 7 may be transformed into an AI-AI SLG model map 190 of FIG. 8, which more clearly illustrates the linear relationship between the pulse-echo-derived acoustic impedance values and measured flexural attenuation values beneath the evanescence point. The SLG model map 190 compares acoustic impedance derived from measurements of flexural attenuation in units of MRayl (ordinate 192) and acoustic impedance measurements in units of MRayl (abscissa 194). The AI-AI SLG model map 190 still includes a gas threshold range 166 and nominal point 168 corresponding to gas behind the casing 22, a liquid threshold range 170 and a nominal point 172 corresponding to liquid behind the casing 22, and a solid threshold range 174 corresponding to solid material (e.g., cement) behind the casing 22. Because the AI-AI SLG model map 190 is plotted in an AI-AI scale, when the parameters to the acoustic cement evaluation data are correctly chosen, the two acoustic impedance sets of data should align generally along a unit slope 176 (i.e., a 45 degree line) passing through equal x-y values and the known expected nominal value points 168 and 172.

The AI-AI SLG model map 190 thus may provide the expected nominal values that the acoustic cement evaluation data may match when the parameters for the acoustic cement evaluation data have been properly selected. Deviation or offset of the actually obtained acoustic cement evaluation data and the expected acoustic cement evaluation data may imply parametric errors. For example, a deviation in the actually obtained acoustic cement evaluation data from the ranges 166, 170, and 174 and/or the nominal points 168 and 172, or a mismatch between the actually obtained acoustic impedance measurement and the flexural-attenuation-derived acoustic impedance measurement, at least for the subset of data points beneath the evanescence point 118, may imply parametric errors. One possible parametric error may be an error of the acoustic impedance of the fluid (Zmud) in the wellbore 16. Another possible parametric error may be an error in the calibration of the flexural attenuation measurement. Here, it may be noted that different parameter errors may affect the actually obtained acoustic cement evaluation data in different ways. A Zmud parameterization error may be amplified by a factor substantially larger than one, such as a factor of five, onto the acoustic impedance measurement. By contrast, such a Zmud parameterization error may be amplified in the flexural-attenuation-derived acoustic impedance Z(FA) by a factor approaching one. On the other hand, the flexural attenuation calibration may apply to the flexural attenuation measurement, and thus may explain any offset occurring exclusively along the y-axis. By identifying discrepancies between the actually obtained acoustic cement evaluation data and the expected nominal values, these parametric errors may be identified and a remedy may be attempted.

Indeed, the nominal points 168 and 172 in FIG. 8 occur along the unit slope line 176. It may be noted that the unit slope line 176 corresponds to points for which the values Z(FA) are equal to Z(AI). For values corresponding to gas, the acoustic impedance behavior is well defined. For this reason, as will be discussed below, the interval of acoustic impedance over which to perform parametric correction may be chosen to be statistically relevant, and may be less than the full log of acoustic impedance data. It may noted that, for liquids, there may be some uncertainty of the a priori knowledge of the tool nominal values 168 and 172, and therefore a potential for a mismatch between the assumed fluid of the initial parameterization of the acoustic cement evaluation data and the actual fluid behind the casing 22. Indeed, more than one fluid may be layered or may form a gradient of various fluids, throughout the collection of the acoustic cement evaluation data in the wellbore 16. A database of known behavior of fluid properties can help in reducing uncertainty.

Keeping the above in mind, an interval of acoustic cement evaluation data that includes both flexural-attenuation-derived acoustic impedance and pulse-echo-derived acoustic impedance data may be considered in an x-y (AI-AI) density distribution form. A subset of data points beneath the evanescence point 118 may be used for the analysis of parametric correction because, beneath the evanescence point 118, the linearity and unit slope assumption of the AI-AI data is valid over the range associated with the gas and liquid population. However, the processing based on the corrected parameters can be applied to the entire dataset or some portion of the entire dataset, without regard to whether the data points are above or below the evanescence point 118. As mentioned above, the gas and liquid population of AI-AI data points may have a far more precise behavior definition than the range of potential values for solids that may be found behind the casing 22. In addition, the points of the acoustic cement evaluation data that may be examined in a parametric correction process may be those that exhibit at least two distinct density distribution clouds of data below the evanescence point. These may include gas and liquid (G+L), liquid and solid (L+S), gas and solid (G+S) or gas, liquid, and solid (G+L+S). With more than one distinct density distribution cloud of data points, at least one of these clouds (e.g., gas or liquid) may be anchored well to an expected nominal point, as will be described below. Moreover, from these distinct density distribution clouds, the nominal slope may be well defined in the AI-AI plane and a trend line may be derived from these two or three density distribution clouds and their respective local maxima. In fact, in some embodiments, parametric corrections as discussed here may be defined with minor user interaction and performed automatically by the data processing system 38. In some embodiments, a user may select a depth interval over which to estimate and/or apply the parametric correction to the acoustic cement evaluation data. In other embodiments, a user may decide an offset or may augment an attempt automatically generated by the data processing system 38 to cause the acoustic cement evaluation data to more closely align with the expected nominal values.

Figure 9:
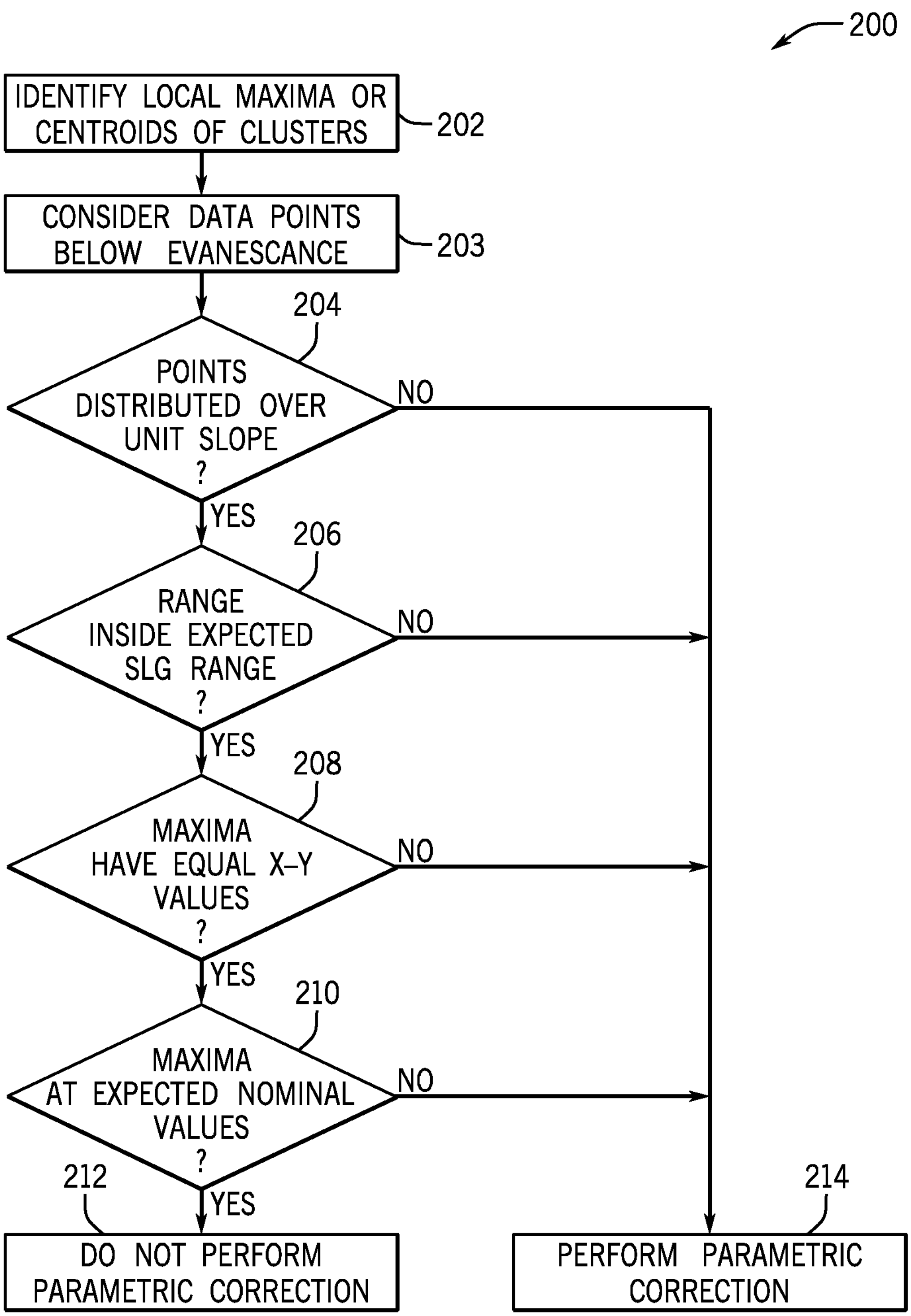
FIG. 9 is a flowchart of a method for determining when parametric correction is warranted by comparing actual acoustic cement evaluation data to expected behavior of the cement evaluation data, in accordance with an embodiment.

As shown in a flowchart 200 of FIG. 9, a collection of the acoustic cement evaluation data over a suitable depth interval may be analyzed to identify local maxima or centroids of clusters of an AI-AI x-y density distribution (block 202). The points that are considered for the analysis of parametric correction may be beneath the evanescence point 118 (block 203). When a correction is developed based on the analysis of points below the evanescence point, the correction may be applied to the entire dataset, including points above the evanescence point. An example of an AI-AI x-y density distribution will be described in greater detail below with reference to FIG. 12.

Continuing with the flowchart 200 of FIG. 9, the data processing system 38 may consider for the analysis of parametric correction whether the data points are distributed generally along a unit slope (decision block 204), whether the data points are distributed within an expected suitable solid-liquid-gas (SLG) range (decision block 206), whether the maxima have substantially equal x and y values (decision block 208), and/or whether the maxima or the centroids of the density distribution clusters are found at the expected nominal values (e.g., the nominal values 168 and 172 discussed above with reference to FIG. 8) (decision block 210). When the above criteria have been meet, the acoustic cement evaluation data may be understood to have been properly parameterized. As such, additional parametric correction may not be performed (block 212). Otherwise, parametric correction may be performed on the acoustic cement evaluation data (block 214).

As will be discussed below, the parametric correction of this disclosure may take place in any suitable manner. One example appears in a flowchart 220 of FIG. 10. Here, the data processing system 38 may receive the acoustic cement evaluation data on which to perform a correction (block 222). The largest population of data points (e.g., a "liquid" cluster or a "gas" cluster) may be identified as a first maxima and a smaller population may be identified as a second maxima (block 224). In a first alternative path (ALT 1), if the first maxima is not at the expected nominal point (decision block 226), an offset may be determined that causes the first maxima to reach the nominal point (block 228). The data processing system 38 further may verify that this correction results in a unit slope and that the second maximum is closed to its corresponding nominal point (block 230). The data processing system 38 may implement the correction in any suitable manner using an entirety or just part of the dataset, which may include data points both above and below the evanescent point (block 231). If the first maxima is determined to be at the expected nominal point (decision block 226), no parametric correction may be applied or the second maxima may be considered instead (block 232).

Alternatively, the same exercise can be done starting with the second maxima instead of or in addition to the first maxima, as illustrated in a second alternative path (ALT 2). If the second maxima is not at its corresponding nominal point (e.g., 168 or 172) (decision block 233), the data processing system 38 may determine an offset that would cause the second maximum to be centered on the corresponding nominal point (block 234). The data processing system further may verify that the correction results in a unit slope and that the first maximum remains near to its corresponding nominal point (block 236). If the second maxima is determined to be at the expected nominal point (decision block 233), no parametric correction may be applied or the first maxima may be considered instead (block 238).

The processing system 38 may implement any of these corrections (block 231) in the acoustic cement evaluation data in any suitable way. Moreover, the acts of block 231 may occur after the offsets for the first and/or second maximum have been determined (e.g., after the acts of block 228 and 234), or may occur when these offsets are determined. The corrections of block 231 may represent, for example, (1) applying a manual offset to the acoustic cement evaluation data and/or (2) adjusting the parameters affecting the acoustic cement evaluation data directly. With regard to the second example, the initial parameters may be changed to second parameters that cause the acoustic cement evaluation data to more closely match the expected nominal values.

Figure 10:
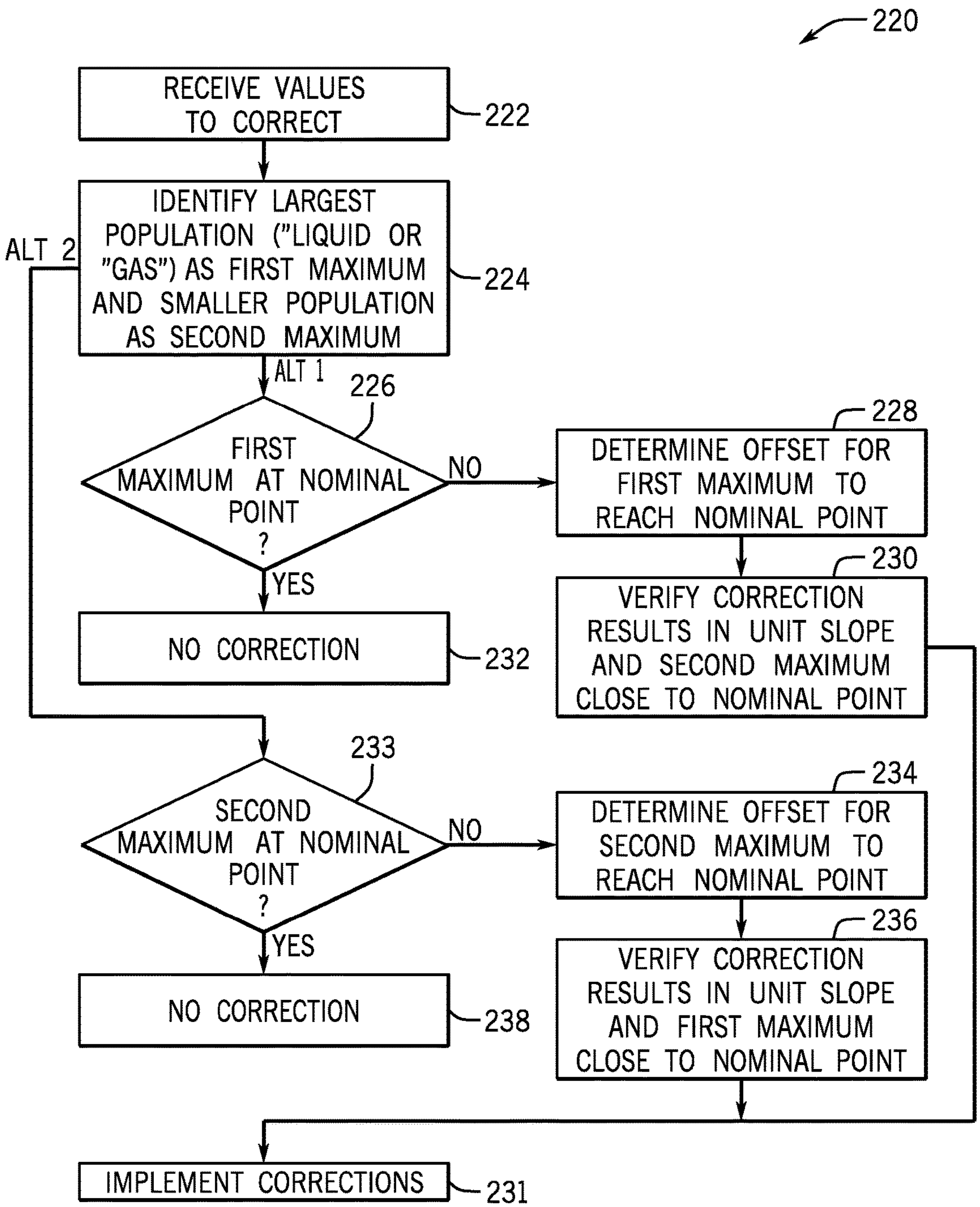
FIG. 10 is a flowchart of a method for ensuring the correction of the acoustic cement evaluation data to more closely resemble the expected cement evaluation data, in accordance with an embodiment.

FIG. 11 illustrates an example of applying such offsets to perform a parametric correction of cement evaluation data as described in FIG. 10. In FIG. 11, a density distribution plot 250 compares flexural-attenuation-derived acoustic impedance Z(FA) in units of MRayl (ordinate 252) to pulse-echo-derived acoustic impedance Z(AI) in units of MRayl (abscissa 254). In the example of plot 250, a gas cluster 146 (G) having a centroids or local maximum 256 and a liquid (L) cluster 148 having a centroids or local maximum 258 are adjusted to match the expected nominal points 168 and 172 for gas and liquid, respectively. Each is shown in FIG. 11 as an "anchor point." Before correction, the local maxima 256 and 258 are aligned in a non-unit slope 260. The maxima 256 and 258 may be adjusted to the nominal points 168 and 172, respectively, to cause the data to exhibit a proper one-to-one x-y relationship along the unit slope 176. As mentioned above, these offsets may be produced "manually," in which the acoustic cement evaluation data is corrected without changing the underlying parameters that produce the original, erroneous results. Additionally or alternatively, the data processing system 38 may select a different parameterization until the acoustic cement evaluation data substantially matches the expected nominal values.

Figure 13:
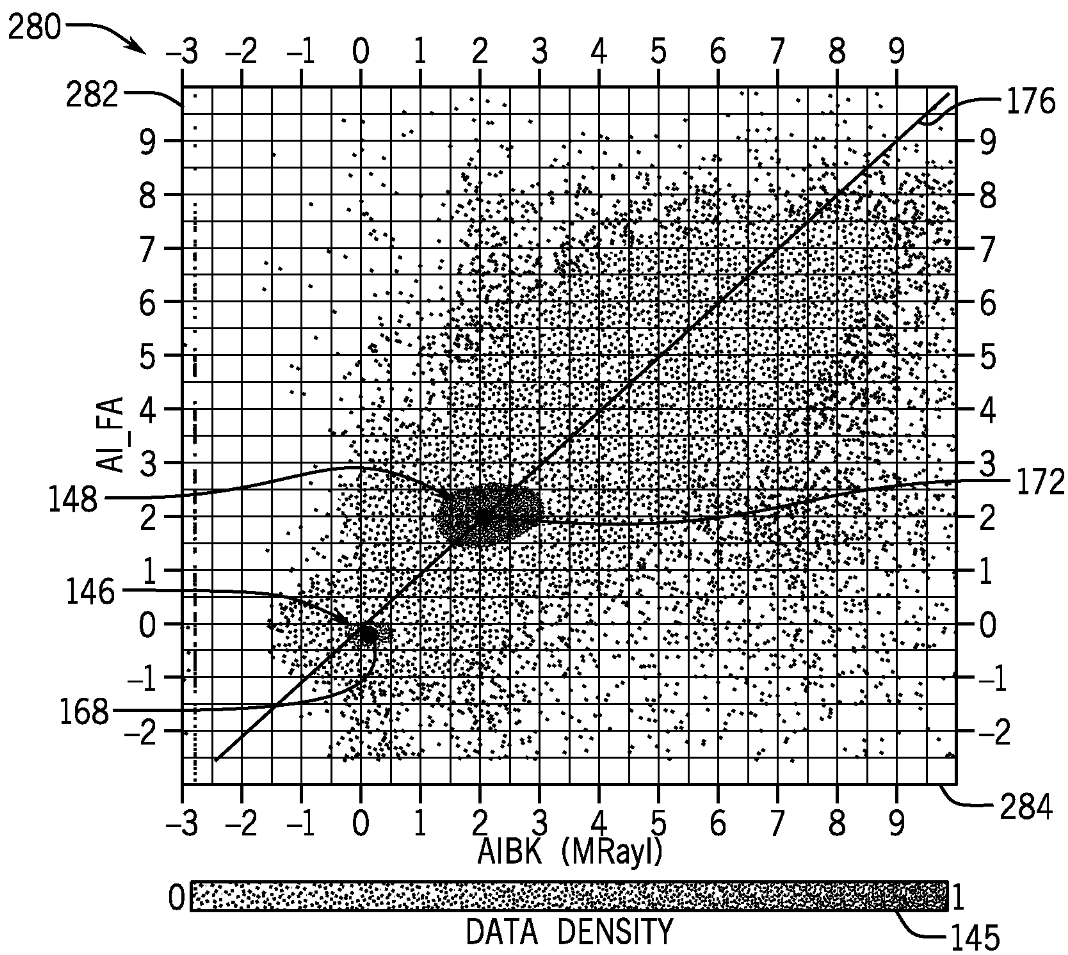

FIGS. 12 and 13 illustrate the method of FIGS. 4, 9, and 10 as applied to experimental acoustic cement evaluation data. Specifically, FIG. 12 illustrates an AI-AI x-y density distribution 270 comparing flexural-attenuation-derived acoustic impedance Z(FA) in units of MRayl (ordinate 272) to pulse-echo-derived acoustic impedance Z(AI) in units of MRayl (abscissa 274). A legend 145 represents data density. The AI-AI x-y density distribution 270 of FIG. 12 includes two identifiable density distribution clusters—a gas cluster 146 and a liquid cluster 148—whose centroids or local maxima may be adjusted to align to the nominal gas and liquid points 168 and 172, respectively.

Correcting the data of FIG. 12 as indicated may produce a parametrically corrected AI-AI x-y density distribution 280, which is shown in FIG. 13. In the AI-AI x-y density distribution 280 of FIG. 13, flexural-attenuation-derived acoustic impedance Z(FA) in units of MRayl (ordinate 282) is compared to pulse-echo-derived acoustic impedance Z(AI) in units of MRayl (abscissa 284), in the same manner of FIG. 12. A legend 145 represents the data density. In FIG. 13, the gas cluster 146 now is substantially aligned with the gas nominal point 168. Likewise, the liquid cluster 148 is now substantially aligned with the liquid nominal point 172 along the unit slope line 176. This parametrically corrected acoustic cement evaluation data may be used to more accurately identify the characteristics of material behind the casing 22.

Parametric Correction of Single-Measurement Acoustic Cement Evaluation Data

A single measurement of acoustic cement evaluation data—such as just the flexural attenuation data or just the acoustic impedance data—may also be parametrically corrected. Indeed, a similar approach can be carried out using measurements of acoustic impedance alone or acoustic impedance measurement derived from flexural attenuation. This parametric correction may be distinguished from acoustic impedance "standardization" that may be carried out over known conditions, such as a known free-pipe interval of the wellbore 16 that includes liquid in the annulus 20. Indeed, the parametric correction discussed here involves analyzing the density distribution behavior of the acoustic impedance or the flexural-attenuation-derived acoustic impedance over any suitable interval, including the entire interval that is desired to be examined to determine the material located behind the casing 22.

As shown by a flowchart 290 of FIG. 14, the single measurement of acoustic cement evaluation data, such as acoustic impedance, flexural attenuation, or flexural-attenuation-derived acoustic impedance (FA-derived AI) may be considered by the data processing system 38 for any suitable interval using data points beneath the evanescence point 118 (block 292). The data processing system 38 may investigate the density distribution population distribution (block 294). The data processing system 38 further may, if warranted, perform parametric correction to fit local maxima in the density distribution population distribution to expected nominal anchor points (block 296). It may be appreciated that the curves 152 and 154 of FIG. 6 represent examples of single-measurement density distributions that may be used in parametric correction.

As shown in a flowchart 300 of FIG. 15, investigating the density distribution population distribution as described above with reference to block 294 of FIG. 14, may take place as shown by a flowchart 300 of FIG. 15. Examining a density distribution of a single measurement (e.g., the curve 154 of acoustic impedance measurements shown in FIG. 6), local maxima may be identified by the data processing system 38 (block 302). The processing system 38 may observe certain criteria, including whether the distribution of the single-measurement density distribution includes data points distributed within the solid-liquid-gas (SLG) range (decision block 304), and whether the identified maxima occur at expected nominal values (decision block 306). For instance, the local maxima associated with gas may be centered on an acoustic impedance value of 0 MRayl.

When the criteria described in decision blocks 304 and 306 are met, parametric correction may not be performed (block 308). Otherwise, the data processing system 38 may apply a parametric correction to the single-measurement acoustic cement evaluation data (block 310). It should be understood that the correction may occur in any suitable fashion. For instance, the data processing system 38 may adjust the values in substantially the same manner as described above with reference to FIG. 10, except that the data processing system 38 may not consider the slope of a relationship between two measurements, but rather may focus on the relationship between the expected nominal points and the clusters.

Processing Acoustic Cement Evaluation Data Using a Priori Solid-Liquid-Gas (SLG) Models After obtaining the acoustic cement evaluation data, the data—whether parametrically corrected or not—may be processed using any suitable a priori model. These may include, as discussed above with reference to FIG. 3, a conservative solid-liquid-gas (SLG) model, a "tight" SLG model 84, and/or a flexural attenuation-evanescence-acoustic impedance (Flex-Eva-AI) SLG model 86. Although this disclosure describes these models in particular, it should be appreciated that other models that can discriminate between solids, liquids, and/or gases behind the casing 22 based on the acoustic cement evaluation data may be employed.

Conservative Solid-Liquid-Gas (SLG) Model

As discussed above, the conservative solid-liquid-gas (SLG) model 82 referred to in the flowchart of FIG. 3, which may also be referred to as a conservative SLG model map, may provide helpful insight into the classification of the material behind the casing 22. The conservative SLG model 82 may enable operators to determine whether solid cement has properly set behind the casing 22 in the annulus 20, or whether some sort of fluid or gas is present instead. As noted above, FIG. 7 represents a solid-liquid-gas (SLG) model map 160 that may be used to classify materials behind the casing 22 at a given depth depending on the acoustic cement evaluation data obtained by the acoustic tool(s) 26 at that depth. As noted above, the SLG model map 160 plots flexural attenuation in units of dB/cm (ordinate 162) against acoustic impedance in units of MRayl (abscissa 164). When the x-y point relating the flexural attenuation and acoustic impedance (AI or Z) at a particular depth falls within the threshold range 166, the material located behind the casing 22 at that depth may be classified as a gas. When the x-y point falls within the threshold range 170, the material located behind the casing 22 at that depth may be classified as a liquid. When the x-y point falls within the threshold range 174, the material located behind the casing 22 at that depth may be classified as a solid. Although the conservative SLG model map 160 is a model that has been used in the past, here, the SLG model map 160 of FIG. 7 may be improved by using the parametrically corrected acoustic cement evaluation data and/or the posteriori refinement that will be discussed further below.

In one example, the conservative SLG model map 160 may be developed through an a priori computer simulation (e.g., a Monte Carlo simulation) of data points that may be measured by the acoustic tool(s) 26 relating to solids, liquids, or gases that may appear in the wellbore 16, with noise estimates and/or other parameters propagated through the model. The a priori parametric and/or data noise estimates used to generate the conservative SLG model map 160 may be any suitable parametric and/or data noise estimates that, based on collections of empirical data from various wells, would be understood to conservatively classify acoustic cement evaluation data points as solids, liquids, and gases.

Figure 16:
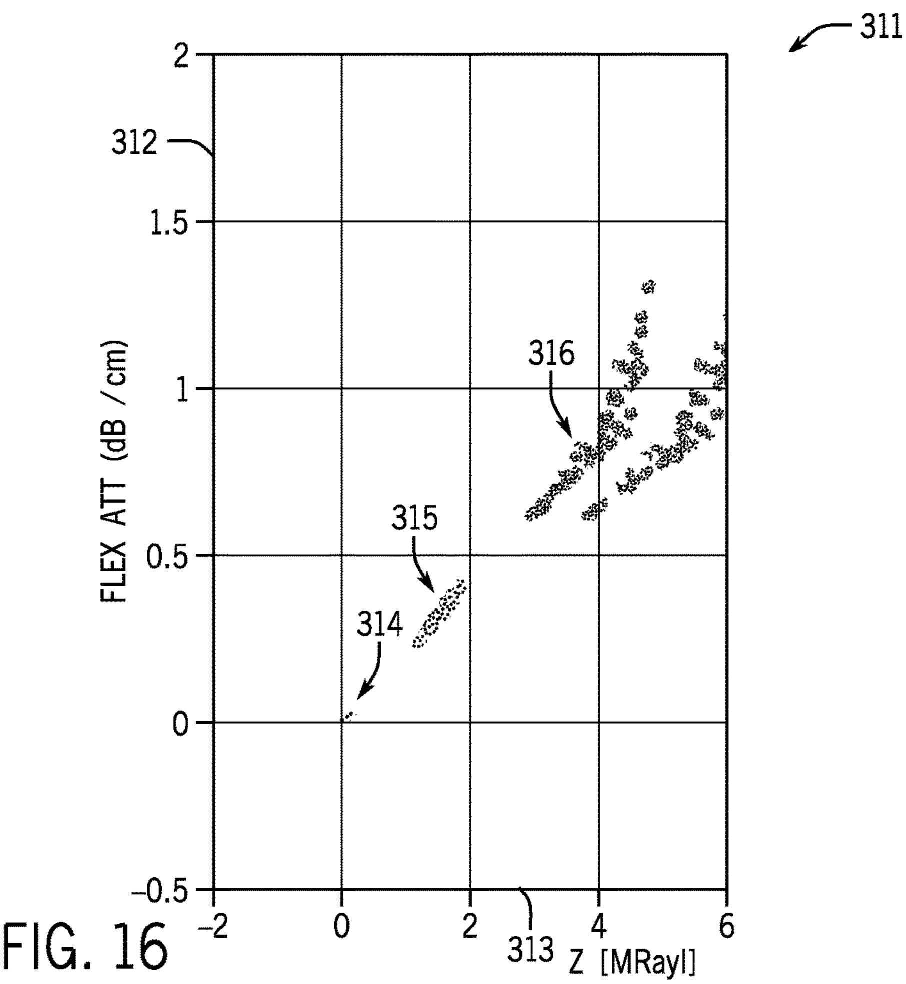
FIG. 16 is a plot of data points used to develop a solid-liquid-gas (SLG) model map when the data points used in a computer model, in accordance with an embodiment.
Figure 17:
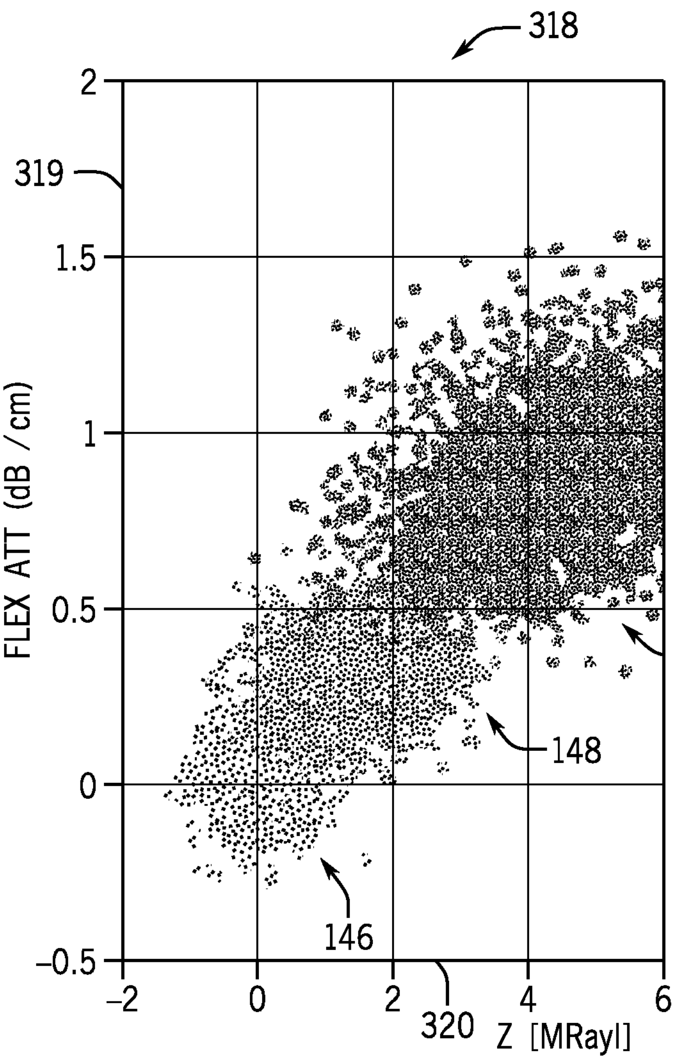
FIG. 17 is a plot of data points that may be used to generate the conservative SLG model map of FIG. 7 by using a first noise estimate propagated through a computer model, in accordance with an embodiment.

FIGS. 16 and 17 illustrate one example of determining the conservative SLG model map 160 of FIG. 7. FIG. 16 illustrates a plot 311 of assumed data points that, without any noise, could be detected by the acoustic tools 26. The plot 311 relates flexural attenuation (Flex Att) in units of dB/cm (ordinate 312) against acoustic impedance (Z) in units of MRayl (abscissa 313). A first noiseless data cluster 314 illustrates data points that would represent a gas behind the casing 22, a second noiseless data cluster 315 illustrates data points that would represent a liquid behind the casing 22, and a third noiseless data cluster 316 represents data points that would represent a solid behind the casing 22.

A plot of noisy data points, obtained by propagating a first noise and/or parameter estimate relating to the wellbore 16 through the computer simulation, appears in a plot 318. The plot 318 relates flexural attenuation (Flex Att) in units of dB/cm (ordinate 319) against acoustic impedance (Z) in units of MRayl (abscissa 320). The first noise and/or parameter estimate may be selected to be conservative with respect to previously obtained empirical well logging data. For instance, the uncertainty of the parameters may be conservatively selected to assume a vast range of possible conditions (e.g., from very heavy to very light cement) and the noise estimate may assume the possibility of logging through a very noisy environment (e.g., an oil-based well fluid). The resulting noisy data points include the first cluster 146 relating to gas, the second cluster 148 relating to liquids, and the third cluster 150 relating to solids. Using these clusters, the SLG model map 160 of FIG. 7 may be determined.

Flexural Attenuation-Evanescence-Acoustic Impedance Solid-Liquid-Gas (SLG) Model Other models may be used in addition to or as an alternative to the conservative solid-liquid-gas (SLG) model of FIG. 7. One such model is one that bifurcates its operation depending on the evanescence point. In this disclosure, such a model is referred to as a Flex-EVA-AI SLG model. An example of a Flex-EVA-AI SLG model map 320 appears in FIG. 18. The Flex-EVA-AI SLG model map 320 compares flexural-attenuation-derived acoustic impedance Z(FA) in units of MRayl (ordinate 322) plotted against pulse-echo-derived acoustic impedance Z(AI) in units of MRayl (abscissa 324). As discussed above, properly calibrated flexural attenuation measurements generally increase monotonically with acoustic impedance measurements—until reaching an evanescence point in the acoustic impedance, which represents the transition from a solid that is able to maintain both a compressional and shear propagation to that of just shear propagation. For instance, as discussed above, the flexural attenuation values of FIG. 5 increase monotonically with acoustic impedance until the pulse-echo-derived acoustic impedance reaches the evanescence point 118. Beyond the evanescence point 118, the measured values of either flexural attenuation or acoustic impedance relate to the presence of a solid behind the casing 22, even though the flexural attenuation values no longer increase monotonically with the acoustic impedance. In some implementations of the acoustic tool(s) 26, the evanescence point may occur between approximately 3.5-4.5 MRayls and is a direct result of Snell's Law. Beyond the evanescence point, the flexural attenuation no longer monotonically increases with acoustic impedance, but in fact starts decreasing.

From FIG. 5, it also may be apparent that flexural attenuation on its own may not provide a unique solution to the classification of a material behind the casing 22 as solid, liquid, or gas. The flexural attenuation may use another measurement—here, the pulse-echo-derived acoustic impedance—to provide an unambiguous answer. In essence, the additional information that can be used to properly assign a flexural attenuation data point measurement to a material state may be the determination of whether the corresponding pulse-echo-derived acoustic impedance value at the same depth is above or below the evanescence point. Thus, for a reading below the evanescence point, the flexural attenuation or corresponding flexural-attenuation-derived acoustic impedance Z (AI). Indeed, for a reading below the evanescence point, the flexural attenuation or the transformed flexural-attenuation-derived acoustic impedance Z (AI) may be directly used to analyze the material in the annulus 20.

Figure 18:
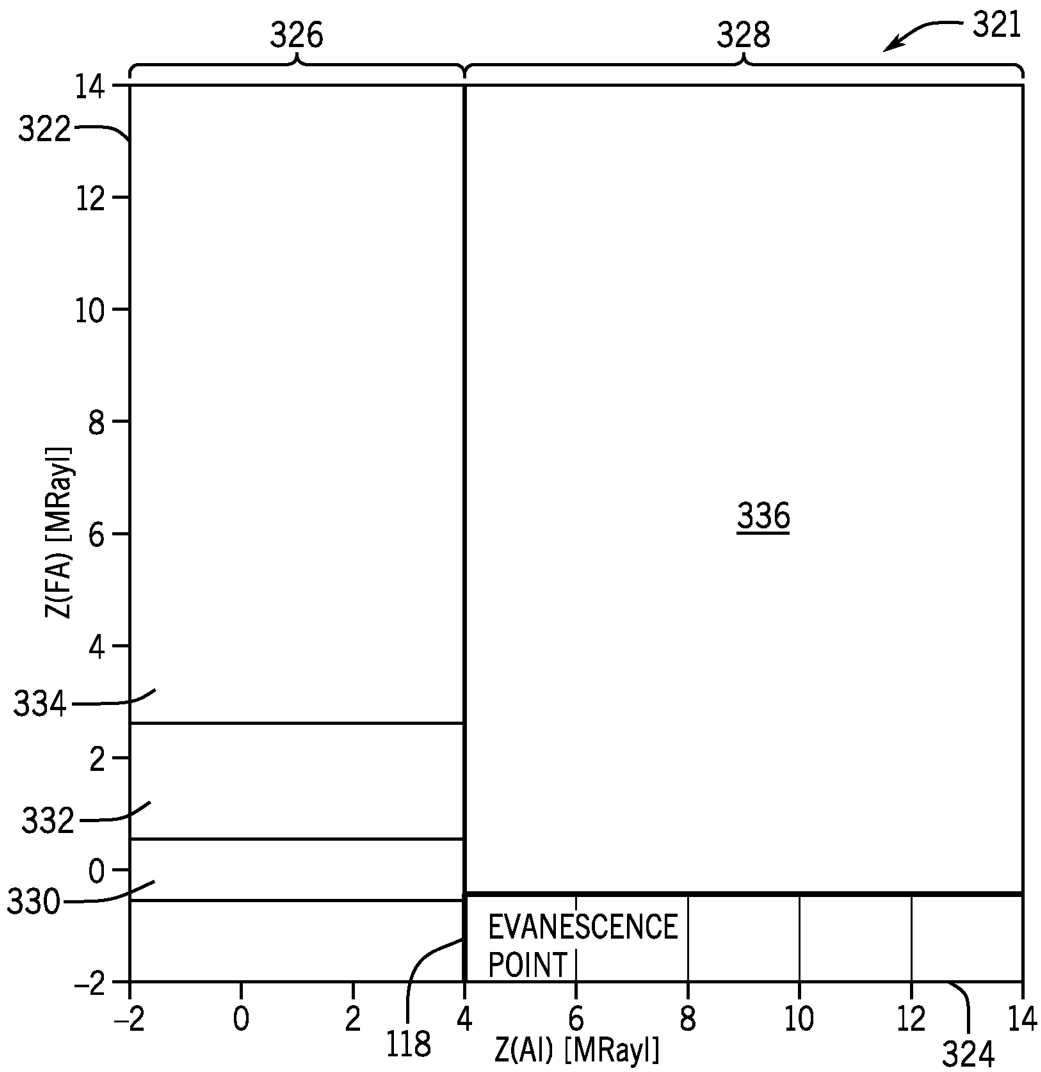
FIG. 18 is an example of a Flex-EVA-AI solid-liquid-gas (SLG) model map that uses flexural attenuation to classify solids, liquids, and gases when acoustic impedance is below an evanescence point, in accordance with an embodiment.

The Flex-EVA-AI solid-liquid-gas (SLG) model map 320 of FIG. 18 takes advantage of this relationship. The Flex-EVA-AI SLG model map 320 is divided into two segments, 326 and 328, that are separated at the evanescence point 118. In the segment 326, a one-dimensional thresholding of the flexural attenuation or, in this case, flexural-attenuation-derived acoustic impedance Z(FA), may be used to discriminate between solids, liquids, and gases behind the casing 22 in the annulus 20. Thresholds in the flexural attenuation or flexural-attenuation-derived acoustic impedance Z(FA) may be used to designate whether the material behind the casing 22 in the annulus 20 is a gas (330), a liquid (332), or a solid (334). In the segment 328 of the Flex-EVA-AI map 320, points beyond the evanescence point may be classified as a solid (336).

The Flex-EVA-AI map 320 of FIG. 18 may leverage to a greater extent some of the benefits of the flexural attenuation measurement over the acoustic impedance measurement when lightweight materials are behind the casing 22 in the annulus 20. These benefits of the flexural attenuation measurement over the acoustic impedance measurement may include better precision and sensitivity to variations in the annulus 20. This may allow the Flex-EVA-AI map 320 to effectively have a larger effective measurement area, and thus a reduced sensitivity to casing rugosity. The Flex-EVA-AI map 320 may also provide reduced sensitivity to the well fluid that pulse-echo-derived acoustic impedance, and any errors related to this parameter—either measured or estimated from a fluid database—may incur.

In addition, the Flex-EVA-AI map 320 may be less complex and more straightforward to implement than the SLG model map 160 of FIG. 7. Indeed, the Flex-EVA-AI map 320 may provide a binary discriminator in relation to pulse-echo-derived acoustic impedance Z (AI). This may reduce uncertainties and enable a refined approach to material classification in difficult logging conditions. Indeed, as illustrated in FIG. 18, the Flex-EVA-AI map 320 may provide a one-dimensional thresholding, defined by two primary threshold cutoffs—(1) a gas to liquid threshold and (2) a liquid to solid threshold—along the ordinate 322 representing the flexural attenuation-based axis.

Figure 19:
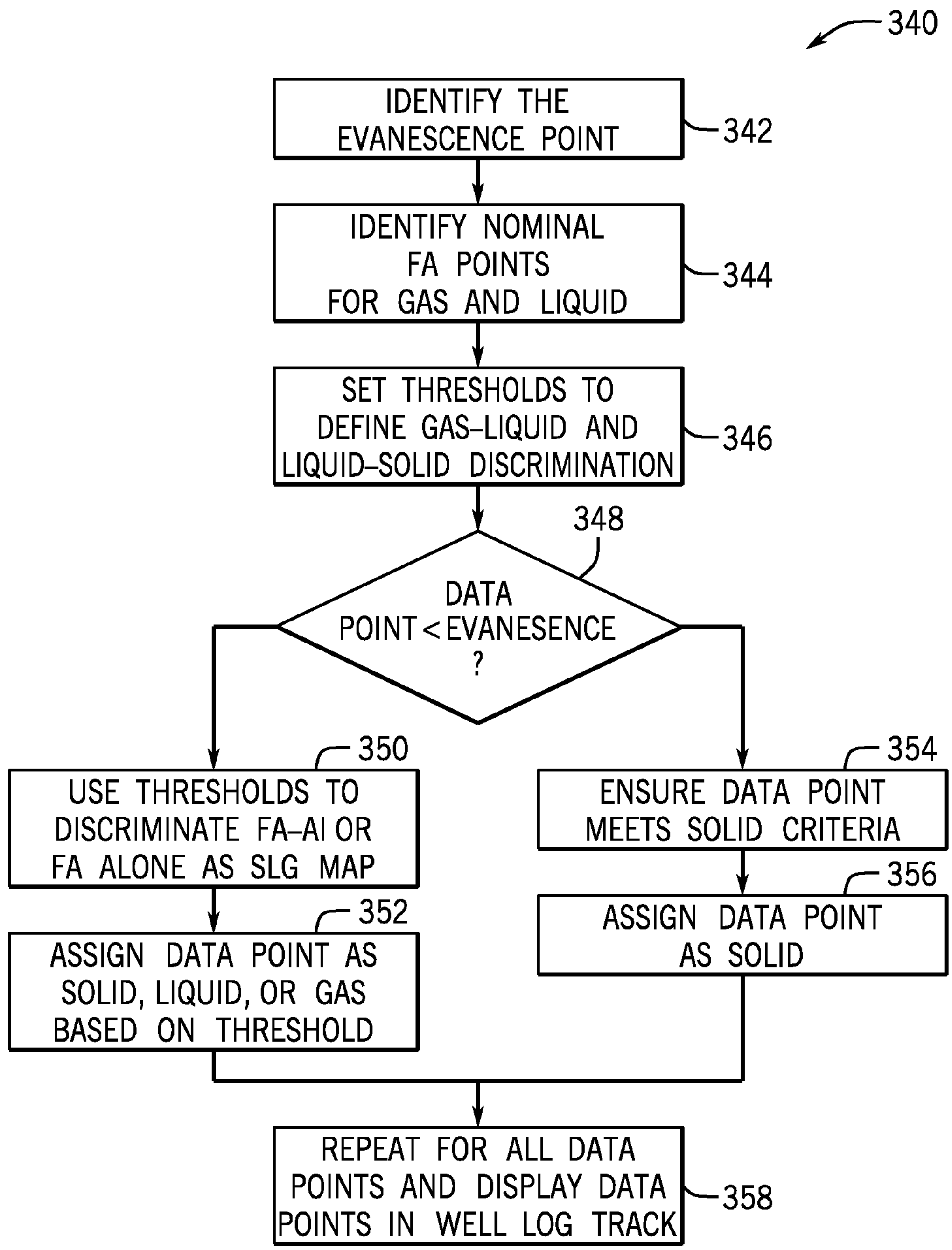
FIG. 19 is a flowchart of a method for using the Flex-EVA-AI SLG model map of FIG. 18, in accordance with an embodiment.

The Flex-EVA-AI model of FIG. 18 may be determined and used as illustrated by a flowchart 340 of FIG. 19. Using flexural attenuation measurements or flexural-attenuation-derived acoustic impedance Z(FA) and pulse-echo-derived acoustic impedance Z (AI), the data processing system 38 may identify the evanescence point (block 342). A good starting point for identifying the evanescence point may be between 3.5 and 4.5 MRayl, but this value may vary for various reasons including changes in behavior of the cement and the properties of the wellbore 16. Any suitable technique (e.g., a user-defined threshold and/or a data-driven threshold) may be used to identify the evanescence point including identifying an inflection point of a density distribution of flexural attenuation values relative to pulse-echo-derived acoustic impedance values.

Using any suitable techniques, nominal data points of flexural attenuation or flexural-attenuation-derived acoustic impedance Z(FA) may be identified for gases and liquids (block 344). The nominal points may be determined, for example, using database values of experimentally obtained or simulated flexural attenuation values for different types of materials behind the casing 22 in the annulus 20.

The data processing system 38 may determine nominal point thresholds defining the transition between flexural attenuation measurements from gas to liquid and from liquid to solid (block 346). In one example, the gas-liquid threshold and liquid-solid threshold may be equal to the respective nominal values, plus some known measurement accuracy of these values (e.g., nominal point+measurement accuracy).

The data processing system may define an x-y data point as a gas, liquid, or solid depending on whether the pulse-echo-derived acoustic impedance Z (AI) is above or below the evanescence point (decision block 348). When the pulse-echo-derived acoustic impedance Z (AI) is below the evanescence point, the data processing system 38 may use the gas-liquid and liquid-solid thresholds for discriminating whether the material behind the casing 22 is a gas, liquid, or solid (block 350). Specifically, the data processing system 38 may assign the data point to be a solid, liquid, or gas based on the threshold (block 352).

If the pulse-echo-derived acoustic impedance Z (AI) is above the evanescence point, the material behind the casing 22 can reliably be defined as a solid. As such, the data processing system 38 may insure that the data point meets solid criteria (e.g., that the pulse-echo-derived acoustic impedance Z (AI) is greater than or equal to the liquid-solid threshold plus some value of measurement accuracy). If so, the data processing system 38 may assign the data point to be a solid (block 356). The data processing system 38 may repeat this process for the acoustic cement evaluation data points and may display these data points in a well log track (block 358).

Figure 20:
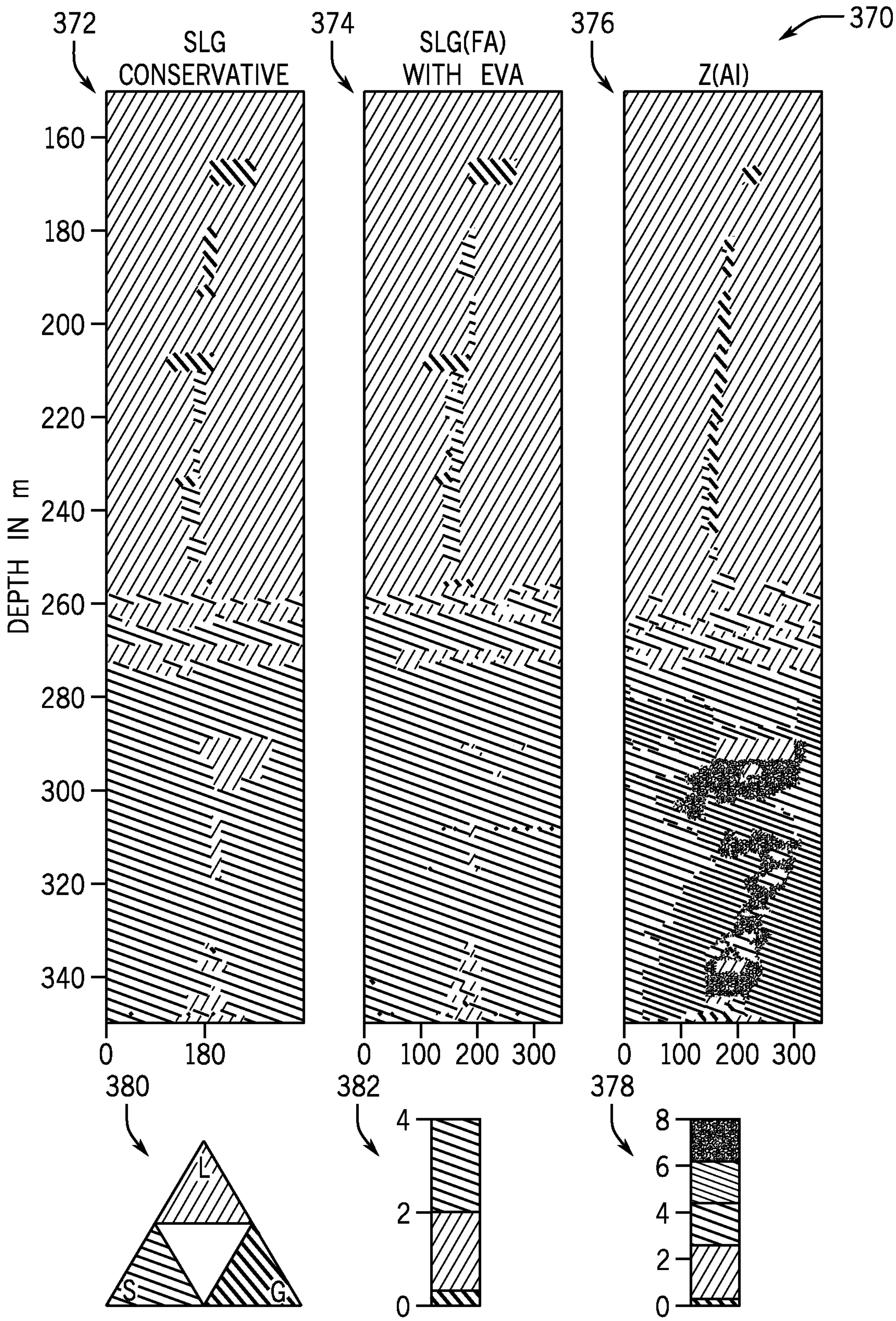
FIG. 20 illustrates three well log tracks: one generated using the conservative SLG model map, one generated using the Flex-EVA-AI SLG model map of FIG. 18, and one of acoustic impedance data, in accordance with an embodiment.

As an example, FIG. 20 provides a sample well log 370 with three tracks 372, 374, and 376 over a depth interval of a test well from about 150-350 meters. The first track 372 represents a well log track that indicates whether a solid, liquid, or gas is likely to be disposed behind the casing 22 based on the conservative solid-liquid-gas (SLG) model map of FIG. 7. The second track 374 represents a well log track determined using the Flex-EVA-AI SLG model of FIG. 18, as carried out by the flowchart 340 of FIG. 19. The third track 376 represents the pulse-echo-derived acoustic impedance Z (AI) over the depth interval. Three legends, 378, 382, and 380 indicate the information conveyed by the three tracks 376, 374, and 372, respectively.

Here, between the depths 260-280 meters, the second track 374 more clearly indicates the presence of solids behind the casing 22 than the first track 372 formed using the conservative SLG model. Note, however, that the Flex-EVA-AI model of FIG. 18 may have an even greater impact on evaluating lightweight cements.

Indeed, it may understood that defining the thresholds of the flexural attenuation used in the Flex-EVA-AI model of FIG. 18 may be particularly challenging when the fluid behind the casing 22 is particularly heavy, while the cement being used behind the casing 22 is particularly light. Under such conditions, defining the threshold in an a priori—that is, prior to logging—fashion may be useful, but may not reflect an optimal choice for some conditions. As such, the parametric correction discussed above may improve the a priori model of the Flex-EVA-AI model of FIG. 18. In addition, as will be discussed further below, the Flex-EVA-AI model may be further refined using posteriori information, which is information acquired during logging.

"Tight" Solid-Liquid-Gas (SLG) Model

Under certain conditions, a "tight" solid-liquid-gas (SLG) model may provide stronger discrimination of solids, liquids, and gases behind the casing 22. In particular, when certain lightweight cements are used, often referred to as ultra-light cements, the data points of the acoustic cement evaluation data that define the presence of a liquid behind the casing 22 may have a much more limited range than in other SLG models. Indeed, a "tight" SLG model map 390 provides an example of a tighter model the can be used to discriminate between solids, liquids, and gases behind the casing 22 in this way. In the tight SLG model map 390 of FIG. 21, flexural attenuation or, in this case, flexural-attenuation-derived acoustic impedance Z(FA) in units of MRayl (ordinate 392) is plotted against pulse-echo-derived acoustic impedance Z (AI) in units of MRayl (abscissa 394). As in the conservative SLG model of FIG. 7, the tight SLG model map 390 includes a threshold range 166 of data points that relate to gas, a threshold range 170 that correspond to liquid, and a threshold range 174 that correspond to solids. Nominal points 168 and 172 still align along the unit slope 176. The ranges 166 and 170 corresponding to gas and liquid, however, may be tighter than the conservative SLG model map of FIG. 7. In addition, this allows, potentially, the definition of patchy dry debonding that may occur in a range 396.

The ranges 166, 170, and 174 of the tight SLG model map 390 may be determined in any suitable way. For example, the conservative SLG model map of FIG. 7 may be refined based on a priori values associated with wells with ultra light cement and/or heavy liquids. For instance, the tight SLG model map 390 may be determined by reducing noise assumptions that are propagated through a computer simulation (e.g., a Monte-Carlo model). Additionally or alternatively, the tight SLG model map 390 may be obtained by reducing the uncertainty of certain parameters used in generating the tight SLG model map 390, such as fluid density, compressional wave velocity (VP), fluid acoustic impedance (Zmud), and/or thickness of the casing 22. In other examples, the tight SLG model map 390 may be determined using a posteriori refinement from the acoustic cement evaluation data obtained from the wellbore 16 that is being evaluated, as will be discussed further below. In the tight SLG model map 390, the gas threshold range 166 is not directly adjacent to the liquid threshold range 170. That is, unlike the conservative SLG model map 160 of FIG. 7, in the tight SLG model map 390 of FIG. 21, the gas threshold range 166 does not directly border a part of the liquid threshold range 170. In this context, the term "directly adjacent" may be understood to mean "not touching." As seen in the tight SLG model map 390, the gas threshold range 166 does not touch the liquid threshold range 170. Rather, there is a space between the gas threshold range 166 and the liquid threshold range 170; when a data point falls in this space, it may be understood to most likely be tool noise and not to represent either a liquid or a gas.

Figure 22:
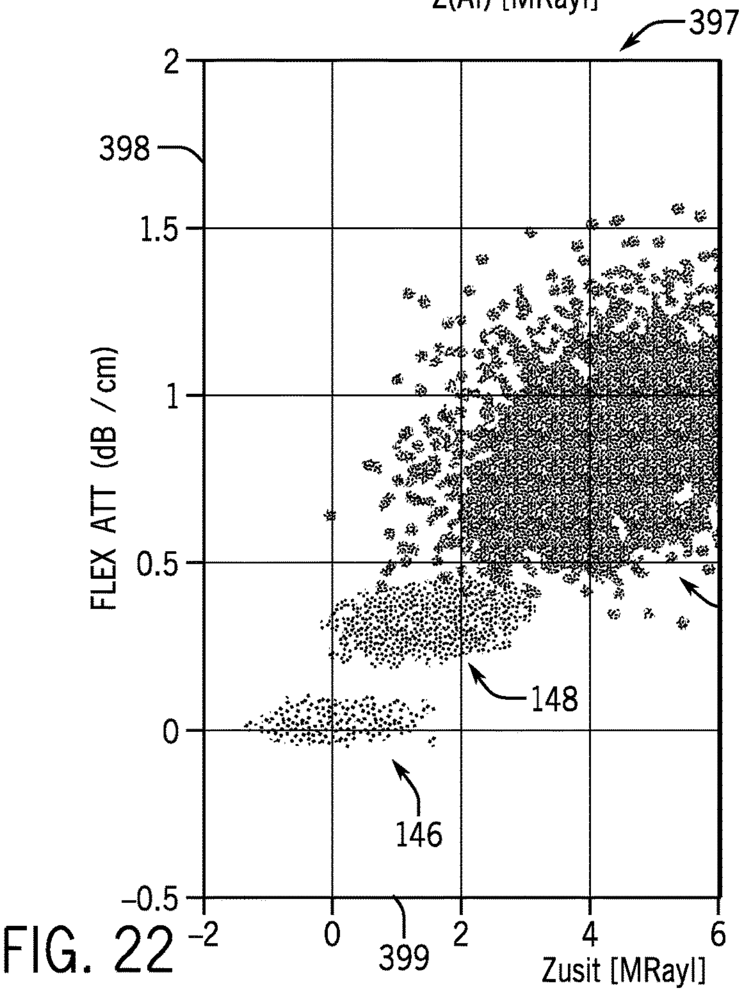
FIG. 22 is a plot of data points that may be used to generate the tight SLG model map of FIG. 21 by using a tighter noise estimate propagated through a computer model, in accordance with an embodiment.

A plot 397 shown in FIG. 22 represents an example of simulated data points that may be used to generate the tight SLG model map 390. The plot 397 may be obtained by propagating a noise estimate through a computer simulation (e.g., a Monte Carlo simulation) of well conditions based on ideal data points from the plot 311 of FIG. 16. It may be recalled that these data points of the plot 311 of FIG. 16 can also be used to determine the conservative solid-liquid-gas (SLG) model map 160 of FIG. 7 by propagating a first noise and/or parameter estimate through the computer simulation. As noted above, the first noise and/or parameter estimate may be selected to be conservative with respect to previously obtained empirical well logging data. For instance, the uncertainty of the parameters may be conservatively selected to assume a vast range of possible conditions (e.g., from very heavy to very light cement) and the possibility of logging through a very noisy environment (e.g., an oil-based well fluid). As also noted above, the result of propagating the first noise estimate through the computer model may be the plot 318 of FIG. 17, which can be used to define the SLG model map of FIG. 7.

Propagating a second estimate through the computer simulation (e.g., a Monte Carlo simulation) of the well conditions with lower noise assumptions and less parameter uncertainty, however, may produce the plot 397 of FIG. 22. For example, by reducing the amount of noise that is estimated to occur in the measurements of the data points from the acoustic tool(s) 26, the computer simulation may produce tighter data point clouds that can form the basis of the "tight" SLG model map 390 of FIG. 21. In the plot 397 of FIG. 22, flexural attenuation (Flex Att) in units of dB/cm (ordinate 398) is plotted against acoustic impedance (Z) in units of MRayl (abscissa 399). The noisy data points produced by the lower noise estimate propagated through the computer simulation may include the first cluster 146 relating to gas, the second cluster 148 relating to liquids, and the third cluster 150 relating to solids. Indeed, as can be seen in FIG. 22, at least the data point clusters 146 and 148—developed using this lower noise estimate—are much tighter than those shown in the plot 318 of FIG. 17, which was determined using a higher noise estimate.

Figure 21:
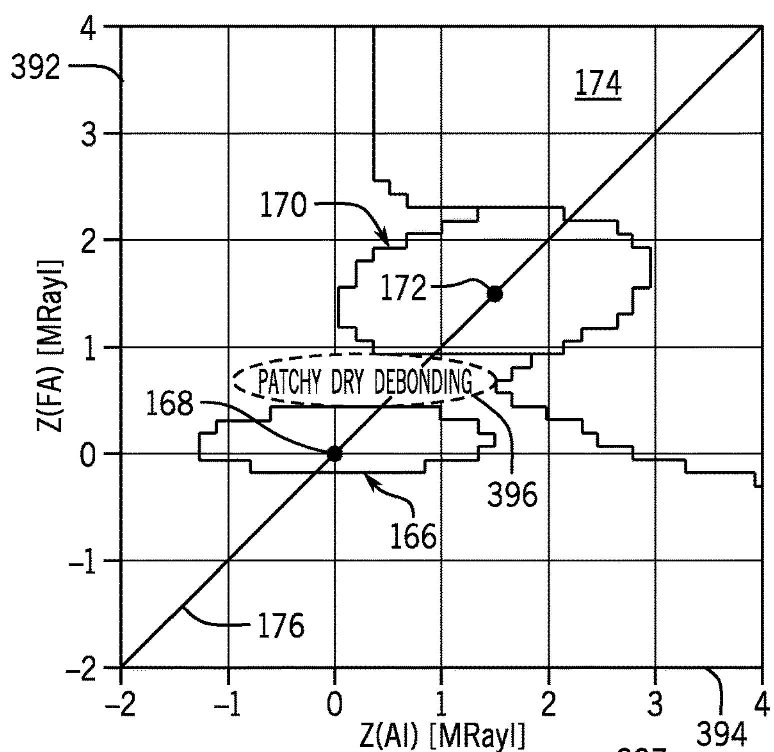
FIG. 21 is a "tight" solid-liquid-gas (SLG) model map that uses tighter tolerances than the conservative SLG model map and may separate a liquid range from a gas range and the liquid range from a light solid range, in accordance with an embodiment.

The noise estimate that is propagated through the computer simulation to generate the plot 397 of FIG. 22, and subsequently the "tight" SLG model map 390 of FIG. 21, may be lower by any suitable amount than that used to generate the plot 318 of FIG. 17, and subsequently the conservative SLG model map 160 of FIG. 7. In one example, the noise estimate in the y-axis used to generate the "tight" SLG model map 390 of FIG. 21 may be lower by about a factor of two to four from that used to generate the conservative SLG model map 160 of FIG. 7. For example, a standard deviation of estimated noise may be reduced by a factor of about up to two to four. Even more, the reduction of estimated noise or parametric uncertainty may be up to approximately 3 standard deviations along the pulse-echo-derived acoustic impedance axis, and may be up to approximately 6 standard deviations along the flexural attenuation or flexural-attenuation-derived acoustic impedance axis. The total reduction in standard deviations of estimated noise and/or parametric uncertainty may be, in some cases, up to a total of 8. Parametric assumptions propagated through the computer simulation may be selected to achieve the "tight" SLG model map 390 of FIG. 21. For instance, a well fluid density, a fluid compressional wave (VP), and/or a well fluid acoustic impedance may be selected using less uncertainty than used to generate the conservative SLG model map 160 of FIG. 7.

Posteriori Refinement of a Priori Models

In many cases, the application of the acoustic cement evaluation data to various a priori models may be further refined to provide an even better manner of classifying the material behind the casing 22 in the annulus 20 of the wellbore 16. Indeed, the conservative solid-liquid-gas (SLG) model map may remain a valuable aid to quickly classify zones of good isolation (e.g., zones where substantially entirely properly cemented material behind the casing 22), moderate isolation (e.g., zones where at least some of the material behind the casing 22 in the annulus 20 is properly cemented material), or free pipe (e.g., zones where substantially no solid material in the analysis behind the casing 22). It may not be uncommon to log depth intervals of the wellbore 16 that contain primarily liquid or gas in the analysis behind the casing 22 over a larger depth interval that is logged. These zones, in which the materials detected in the acoustic cement evaluation data points may be liquids and/or gases, may be used to refine the a priori model measurements by overlaying these solid and/or liquid data points over one of the SLG model maps discussed above.

Figure 23:
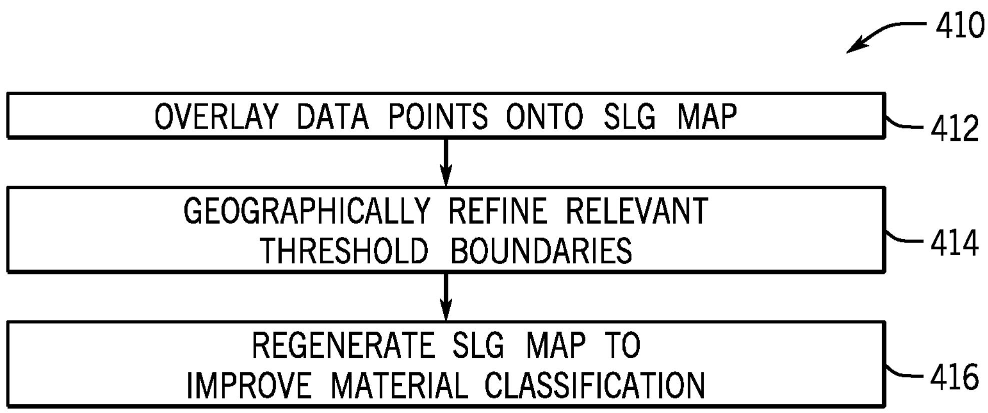
FIGS. 23 and 24 are flowcharts of methods for performing posteriori correction of acoustic cement evaluation data, in accordance with embodiments.

In one example, shown as a flowchart 410 of FIG. 23, the data points of acoustic cement evaluation data obtained at a depth interval where liquid and/or gas is behind the casing 22 in the annulus 20 may be overlaid onto one of the solid-liquid-gas (SLG) model maps discussed above (block 412). For example, the data points from a depth interval of liquid and/or gas in the annulus 20 behind the casing 22 may be overlaid onto the conservative SLG model map discussed above with reference to FIG. 7 above. The data points may be overlaid to form a density distribution plot, as will be discussed below.

The solid, liquid, and gas ranges (e.g., 166, 170, and 174) may be geographically refined (e.g., using a polygon- or polynomial-based approach as manually determined by a user) (block 414). The data processing system 38 may regenerate the resulting solid-liquid-gas (SLG) to use the new newly defined boundaries to more precisely identify solids, liquids, and gases over another interval (e.g., the entire depth interval) where acoustic cement evaluation data has been obtained (block 416). This refined SLG model map may be used to generate a final answer product (e.g., a well log indicating whether the acoustic cement evaluation data points obtained at various depths in the wellbore 16 indicate a solid, liquid, and/or gas behind the casing 22 in the annulus 20.) The refined SLG model map may be more precise and/or accurate than the initial SLG model map.

Figure 24:
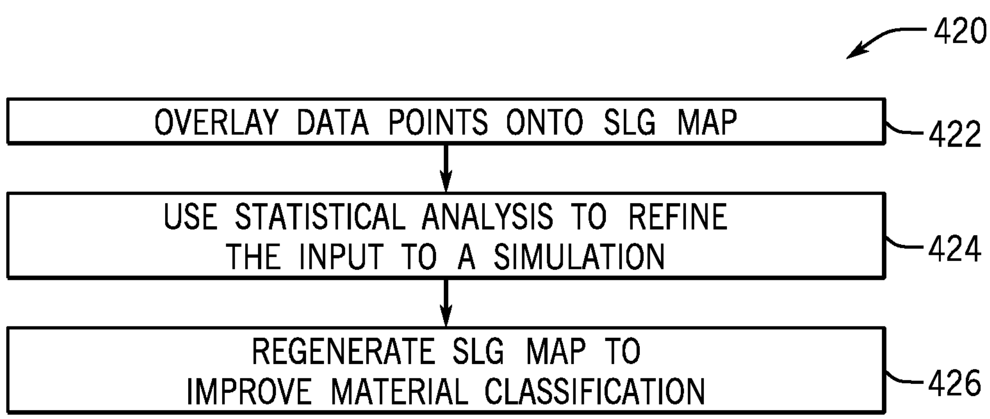

In another example, shown as a flowchart 420 of FIG. 24, the data points from the liquid and/or gas interval of the well may be overlaid onto a SLG model map (block 422), and a statistical analysis may be used to refine the data points using a computer simulation (block 424). For example, the statistical analysis may refine the input to a Monte-Carlo simulation that is used in an SLG model mapping in the manner discussed above with reference to the "tight" SLG model. The data processing system 38 may regenerate the resulting solid-liquid-gas (SLG) to use the new newly defined model (block 426). As before, the refined SLG model map may be more precise and/or accurate than the initial SLG model map.

Figure 25:
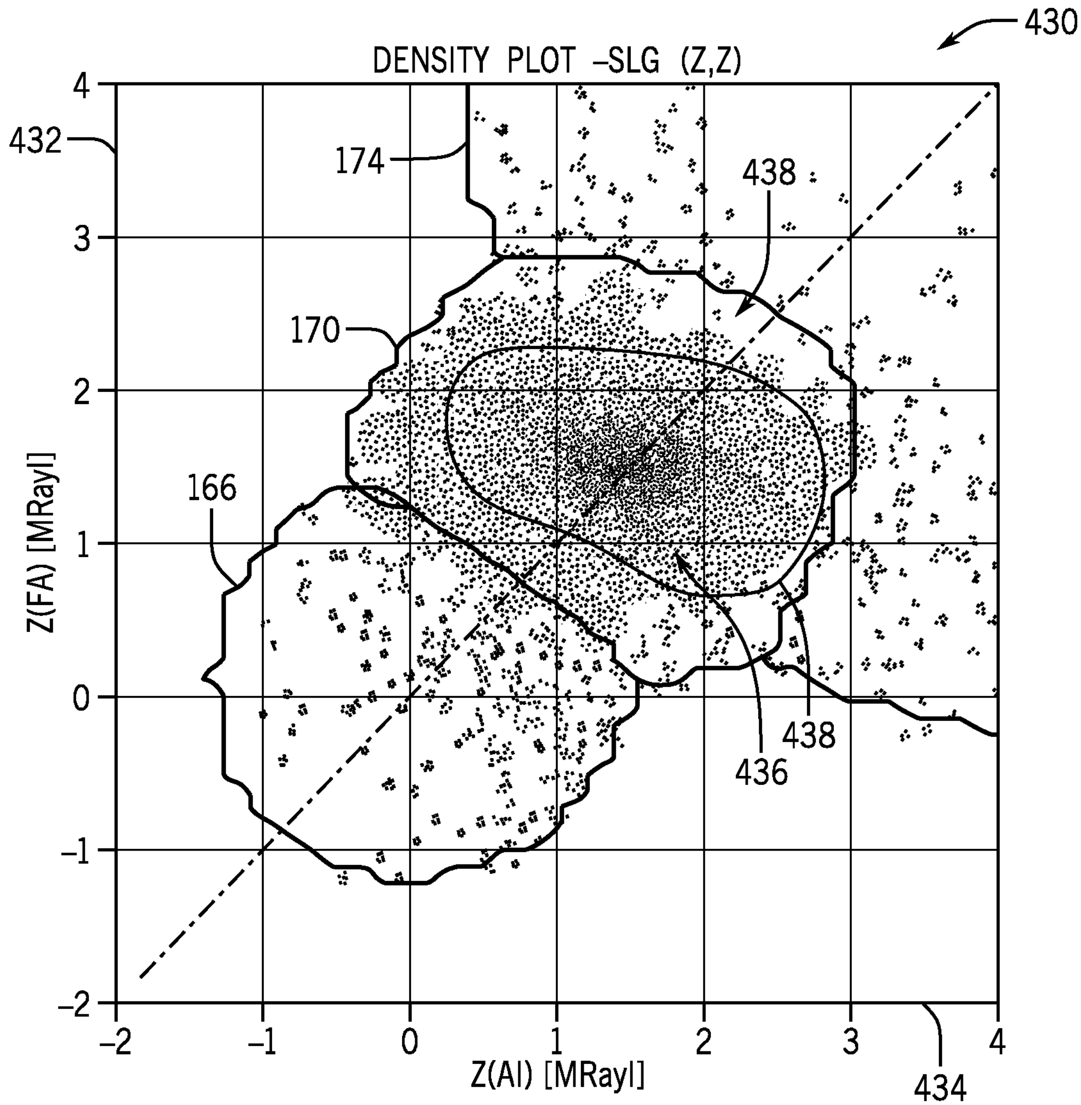
FIG. 25 is an example density plot of acoustic cement evaluation data overlaid on a conservative SLG model map, in accordance with an embodiment.

FIGS. 22 and 23 illustrate examples of posteriori refinement as described with reference to FIGS. 20 and/or 21. FIG. 25 illustrates a density map 430 of acoustic cement evaluation data plotted as flexural-attenuation-derived acoustic impedance Z(FA) in units of MRayls (ordinate 432) and pulse-echo-derived acoustic impedance Z(AI) in units of MRayls (abscissa 434). Here, a conservative model of SLG is displayed, including a gas threshold range 166, a liquid threshold range 170, and a solid threshold range 174. The unit slope line 176 is also shown. A density mapping 436 of data points correlated with a depth interval of the wellbore 16 in which liquid and/or gas are present behind the casing 22 in the annulus 20 of the wellbore 16. As seen in the example of FIG. 25, the data points appear to correspond to liquid, but the points do not extend into a range 438 where, if the SLG model map properly identified liquids, the data points would be expected to appear. This suggests that the conservative SLG model map may be ill-suited for mapping this particular well. As such, a user may select another a priori mapping that might be better suited.

Figure 26:
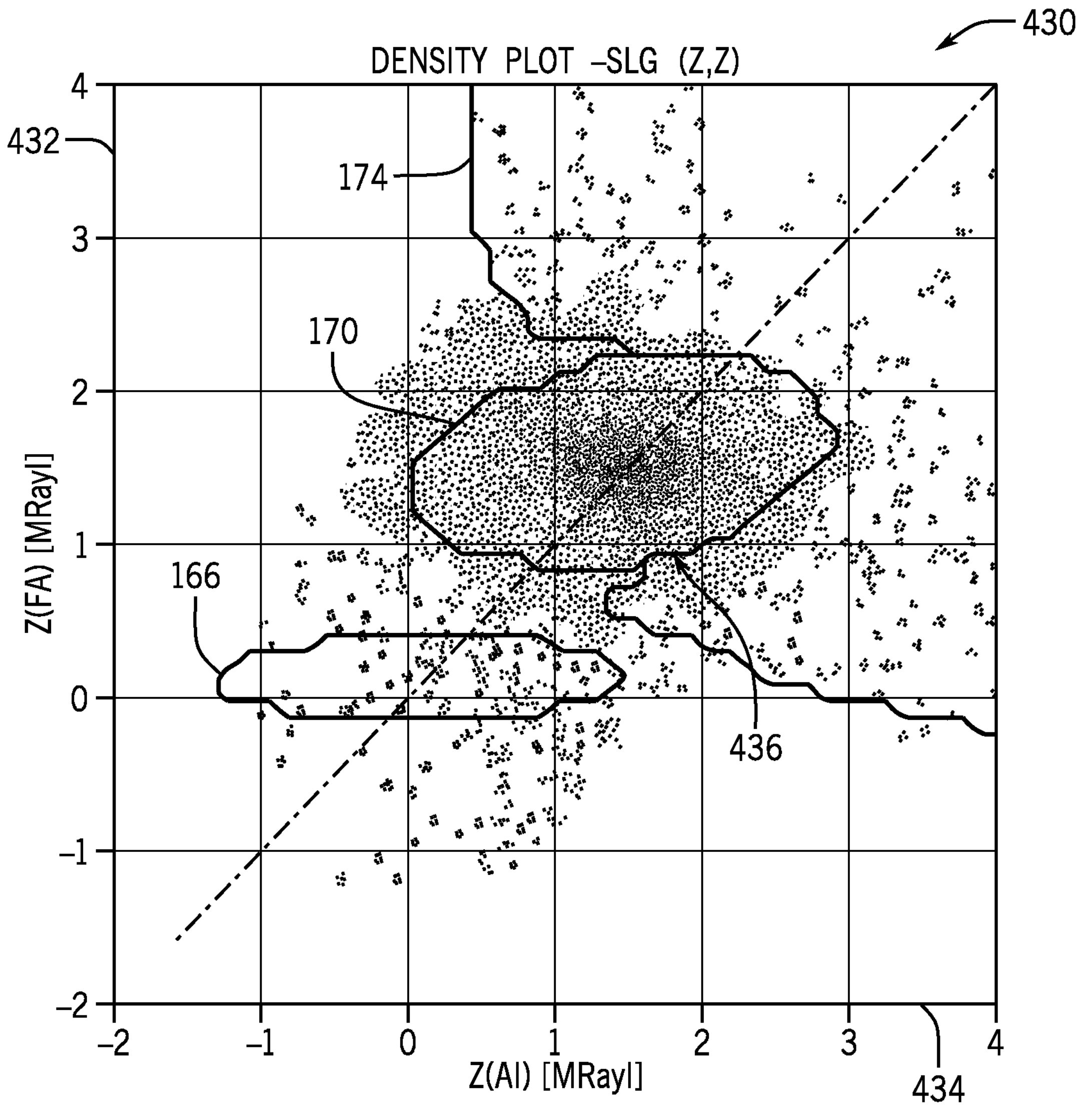
FIG. 26 is an example density plot of the same acoustic cement evaluation data overlaid on the "tight" SLG model map of FIG. 21, which provides a better fit under these circumstances, in accordance with an embodiment.

A plot 440 of FIG. 26 illustrates an improved solid-liquid-gas (SLG) map that has been refined using the posteriori knowledge shown above. In the plot 440, flexural attenuation-derived acoustic impedance Z(FA) in units in MRayls (ordinate 442) is plotted against pulse-echo-derived acoustic impedance Z(AI) in units of MRayls (abscissa 444). Here, a "tight" SLG model map results. When the data density 436 is overlaid on the tight SLG model map, it may apparent that the data more closely correlate to the liquid threshold range 170 of the tight SLG model map than the corresponding liquid threshold range 170 in the conservative SLG model map shown in FIG. 25. As such, the tight SLG model map shown in FIG. 26 may be better suited to determine whether solids, liquids, or gases are present behind the casing 22 in the annulus 20.

Further refinements are possible, including further statistical analysis to determine an even more appropriate SLG model mapping using such posteriori values. For instance, the liquid threshold range 170 shown in FIG. 26 may be further varied to more closely match the actual values that have been obtained through the depth interval of the wellbore where liquid is determined to be behind the casing 22 in the annulus 20.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:

receiving acoustic cement evaluation into a data processing system, wherein the acoustic cement evaluation data derives from one or more acoustic downhole tools used over a depth interval in a well having a casing, wherein the acoustic cement evaluation data comprises flexural attenuation and acoustic impedance, wherein the acoustic cement evaluation data has a first parameterization;

correcting at least a portion of the entire acoustic cement evaluation data to account for errors in the first parameterization using the data processing system, thereby obtaining corrected acoustic cement evaluation data, wherein the correction is estimated based on a relationship between the flexural attenuation and the acoustic impedance;

plotting acoustic cement data points, wherein each acoustic data point indicates a value of received acoustic impedance and flexural attenuation measured at a same depth, processing the corrected acoustic cement evaluation data with an initial solid-liquid-gas model using the data processing system, wherein the initial solid-liquid-gas model includes one or more threshold ranges for identifying data points corresponding to liquid, solid or gas;

performing a posteriori refinement of the initial solid-liquid-gas model in the data processing system, thereby obtaining a refined solid-liquid-gas model, wherein the refined solid-liquid-gas model includes one or more refined threshold ranges for identifying data points corresponding to liquid, solid or gas; and generating a well log track that indicates whether a material behind the casing is a solid, liquid, or gas by processing the corrected acoustic cement evaluation data using the refined solid-liquid-gas model in data processing system.

2. The method of claim 1, wherein correcting the acoustic cement evaluation data comprises:

analyzing a subset of the acoustic cement evaluation data, wherein the subset of the acoustic cement evaluation data comprises at least some data points of the acoustic cement evaluation data points, the data points of the subset being beneath an evanescence point;

estimating a correction to the acoustic data that causes at least the subset of the acoustic cement evaluation data to more closely match expected nominal values; and applying the correction to at least the portion of the entire acoustic cement evaluation data.

3. The method of claim 2, wherein applying the correction comprises re-parameterizing at least the portion of the entire acoustic cement evaluation data to account for the errors in the first parameterization.

4. The method of claim 2, wherein applying the correction comprises applying an offset to at least the portion of the entire dataset of the acoustic data to cause at least the subset of the acoustic cement evaluation data to more closely match the expected nominal values.

5. The method of claim 1, wherein the initial solid-liquid-gas model with which the corrected acoustic cement evaluation data is processed comprises:

a first solid-liquid-gas model comprising a first gas threshold range, a first liquid threshold range, and a first solid threshold range;

a tight solid-liquid-gas model comprising a second gas threshold range, a second liquid threshold range, and a second solid threshold range, at least one of which is tighter than the corresponding first threshold ranges of the first solid-liquid-gas model; or a solid-liquid-gas model that considers flexural attenuation values of the acoustic cement evaluation data only when a pulse-echo-derived acoustic impedance of the acoustic cement evaluation data is below an evanescence point; or any combination thereof.

6. The method of claim 5, wherein the second gas threshold range is not directly adjacent to the second liquid threshold range.

7. The method of claim 5, comprising generating the tight solid-liquid-gas model, wherein the tight solid-liquid-gas model is generated at least in part by:

reducing noise properties propagated through the first solid-liquid-gas model; or reducing an uncertainty value of a parameter used by the first solid-liquid-gas model, wherein the parameter comprises a well fluid density, a fluid velocity (VP), a well fluid acoustic impedance, or a thickness of the casing, or any combination thereof.

8. The method of claim 1, wherein performing the posteriori refinement comprises:

overlaying a density distribution of at least some of the acoustic cement evaluation data onto a map of the solid-liquid-gas model; and geographically refining solid-liquid-gas threshold boundaries of the map of the initial solid-liquid-gas models to determine the refined solid-liquid-gas model.

9. The method of claim 8, wherein the solid-liquid-gas threshold boundaries are geographically refined using a polygon approach, a polynomial approach, or both a polygon and polynomial approach.

10. The method of claim 1, wherein performing the posteriori refinement comprises:

overlaying a density distribution of at least some of the acoustic cement evaluation data onto a map of the initial solid-liquid-gas model; and applying a statistical analysis of the acoustic cement evaluation data points to determine the refined solid-liquid-gas model.

* * * * *